US008537477B2

(12) United States Patent
Shioda

(10) Patent No.: US 8,537,477 B2
(45) Date of Patent: Sep. 17, 2013

(54) LENS BARREL AND OPTICAL DEVICE

(75) Inventor: Takanori Shioda, Tokyo (JP)

(73) Assignee: Nikon Corporation, Tokyo (JP)

( * ) Notice: Subject to any disclaimer, the term of this patent is extended or adjusted under 35 U.S.C. 154(b) by 274 days.

(21) Appl. No.: 13/010,170

(22) Filed: Jan. 20, 2011

(65) Prior Publication Data

US 2011/0267710 A1 Nov. 3, 2011

(30) Foreign Application Priority Data

Jan. 27, 2010 (JP) .................................. 2010-015238
Jan. 27, 2010 (JP) .................................. 2010-015253

(51) Int. Cl.
*G02B 7/02* (2006.01)
*G02B 15/14* (2006.01)

(52) U.S. Cl.
USPC ............ 359/817; 359/819; 359/701; 359/822

(58) Field of Classification Search
USPC ................... 359/694–704, 811–824
See application file for complete search history.

(56) References Cited

U.S. PATENT DOCUMENTS

| 6,520,691 | B2 | 2/2003 | Nomura et al. | |
|---|---|---|---|---|
| 6,819,502 | B2 | 11/2004 | Nomura et al. | |
| 6,909,464 | B2 | 6/2005 | Nomura et al. | |
| 7,742,237 | B2 | 6/2010 | Nomura et al. | |
| 7,839,586 | B2 * | 11/2010 | Woo et al. ...................... | 359/824 |
| 2011/0286119 | A1 * | 11/2011 | Fukino .......................... | 359/823 |

FOREIGN PATENT DOCUMENTS

| JP | A-2-310551 | 12/1990 |
|---|---|---|
| JP | A-7-225409 | 8/1995 |
| JP | A-2001-215564 | 8/2001 |
| JP | B2-3533131 | 3/2004 |
| JP | A-2005-181456 | 7/2005 |
| JP | B2-4050239 | 12/2007 |
| JP | A-2009-265517 | 11/2009 |
| JP | A-2010-8746 | 1/2010 |

OTHER PUBLICATIONS

Japanese Office Action dated Jan. 17, 2012 issued in Japanese Patent Application No. 2010-015253 (with translation).
Japanese Office Action dated Jan. 24, 2012 issued in Japanese Patent Application No. 2010-015238 (with translation).

* cited by examiner

*Primary Examiner* — Mohammed Hasan
(74) *Attorney, Agent, or Firm* — Oliff & Berridge, PLC

(57) ABSTRACT

A lens barrel comprises barrier blades that open and close in a directional orthogonal to an optical axis; an optical system retention frame that includes a first surface along a direction orthogonal to the axis, the optical system retention frame retaining the optical system and movable with respect to the barrier blades in a direction along the axis; and a coupling plate includes a second surface relatively movable with respect to the first surface, the coupling plate causing the barrier blades to open and close by the coupling plate rotating about the axis; wherein, when the barrier blades are opened, the first surface is can move in the axis direction without abutting against the second surface and, when the barrier blades are closed, the first surface abuts against the second surface and movement of the first surface in the axis direction is restricted.

20 Claims, 17 Drawing Sheets

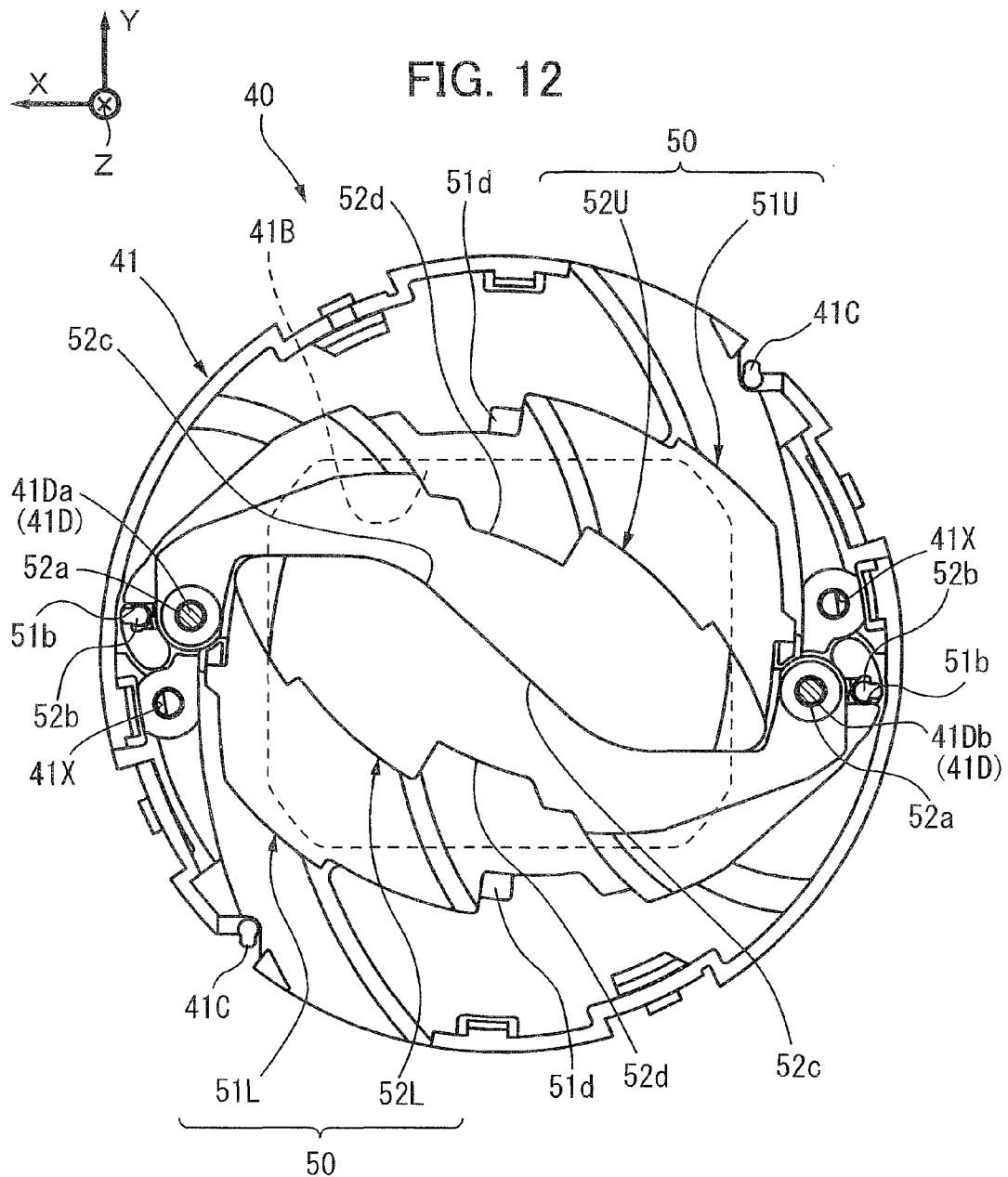

LENS BARREL AND OPTICAL DEVICE

The present application claims priority under 35 U.S.C. §119 to Japanese Patent Applications No. 2010-015238 and No. 2010-015253 filed on Jan. 27, 2010. The content of the application is incorporated herein by reference in its entirety.

BACKGROUND OF THE INVENTION

1. Field of the Invention

The present invention relates to a lens barrel and an optical device.

2. Description of the Related Art

As recited in Japanese Patent No. 3,533,131 and Japanese Patent No. 4,050,239 heretofore, there is a lens barrel that drives a first lens and a lens barrier independently on an optical axis. This lens barrel alters relative positions of the lens barrier and the first lens between a retracted state and a shooting state. That is, in the retracted state, the first lens is withdrawn toward the image side in the optical axis direction such that the lens barrier can close, and in the shooting state, the first lens is moved closer to the lens barrier such that a larger angle of view may be provided without the overall external diameter of the lens barrel increasing.

SUMMARY OF THE INVENTION

In recent years, in order to further widen the angle of a lens, a mechanism has been employed that, in the shooting state, projects a first lens forward in the optical axis direction beyond a position at which the lens barrier is disposed. However, with this mechanism, when the lens barrel is switching to the shooting state, if, for example, the lens barrier is pushed against by an external force and the lens barrier does not open, the first lens (optical system) comes into contact with the lens barrier, and the lens barrier and the first lens may be damaged.

Moreover, when the lens barrel of Japanese Patent No. 4,050,239 is in the retracted state, a front unit is withdrawn to rearward along the optical axis direction with respect to the front unit such that the lens barrier can close. When this lens barrel is in the shooting state, the front unit approaches the lens barrier and the lens barrier withdraws to the optical axis direction outer side with respect to the front unit. Therefore, it is necessary to reserve space for the lens barrier to withdraw at the outer periphery side of the front unit, which limits reductions in size of the lens barrel.

An object of the present invention is to provide a lens barrel and an optical device that can be reduced in size and that prevent contact between a lens barrier and an optical system.

The present invention achieves this object with the solution described below.

According to the first aspect of the present invention, it is provided a lens barrel comprising: barrier blades that open and close in a directional orthogonal to an optical axis of an imaging optical system; an optical system retention frame that includes a first surface provided in a direction orthogonal to the optical axis, the optical system retention frame retaining the optical system and being relatively movable with respect to the barrier blades in a direction along the optical axis; and a coupling plate that includes a second surface that is relatively movable with respect to the first surface, the coupling plate causing the barrier blades to open and close by the coupling plate rotating about the optical axis; wherein, in a state in which the barrier blades are opened, the first surface is capable of moving in the optical axis direction without abutting against the second surface and, in a state in which the barrier blades are closed, the first surface abuts against the second surface and movement of the first surface in the optical axis direction is restricted.

The second surface may be provided in parallel with the first surface.

The first surface and the second surface may be provided in a direction substantially orthogonal to the optical axis.

In the state in which the barrier blades are opened, the first surface may be movable from a position at the image side relative to the second surface to a position at the object side relative to the second surface.

In a shooting state, the optical system of the optical system retention frame may be movable to a position at the object side relative to the barrier blades.

The second surface may be provided at a plurality of locations separated by spacing at the coupling plate.

The lens barrel may further comprise a barrier tube that regulates positions in the optical axis direction of the barrier blades and the coupling plate; and a cam tube including a first cam groove that guides the barrier tube and a second cam groove that guides the optical system retention frame.

An amount of movement of the barrier tube in the optical axis direction between a retracted state and a shooting state may be smaller than an amount of movement of the optical system retention frame in the optical axis direction between the retracted state and the shooting state.

The cam tube may include a third surface that is parallel with the optical axis, the coupling plate includes a fourth surface that is parallel with the optical axis, and the barrier blades are opened by the third surface pushing the fourth surface due to rotation of the cam tube.

The coupling plate may include a protrusion, and the second surface is provided at a portion of the protrusion that is furthest to the image side.

The optical system retention frame may include a hole in a surface that opposes the second surface, the protrusion being insertable into the hole.

The optical system retention frame may include a protrusion, and the second surface is provided at a portion of the protrusion that is furthest to the object side.

The coupling plate may include a hole in a surface that opposes the second surface, the protrusion being insertable into the hole.

According to the second aspect of the present invention, it is provided a lens barrel comprising: a lens with a shape in which edge portion regions of a circular shape are removed along straight lines at two locations so as to be symmetrical about the center of the circle; a lens barrier that opens and closes the object side of the lens; and a lens barrier driving portion that drives the lens barrier such that, in an opened state of the lens barrier, portions of the lens barrier are disposed at the regions that have been removed from the circular shape.

The regions may be removed from the circular shape are outside an effective light path of the lens through which object light that is focused on an imaging unit passes.

The imaging unit may be a rectangular shape with a non-unitary aspect ratio, and the regions removed from the circular shape are regions at both ends in the direction of the short sides of the imaging unit.

The lens barrier may include two sets of barrier blades, in a closed state of the barrier blades, the two sets of barrier blades are deployed by the driving of the lens barrier driving portion so as to cover the object side of the lens, and in an opened state of the barrier blades, the two sets of barrier blades are retracted by the driving of the lens barrier driving portion so as to respectively overlap at positions that are symmetrical about the optical axis and open up the object side of the lens, in the opened state, of each of the sets of barrier blades, a barrier blade that is disposed at the image side is disposed at a location that includes at least a portion of one of the regions removed from the circular shape, and, of each of the sets of barrier blades, a portion of a barrier blade that is disposed at the object side is at the object side in the optical axis direction relative to the region removed from the circular shape, is disposed at a flat surface whose cross-section is circular if the lens is cut in a direction perpendicular to the optical axis, and covers an outer edge portion of an object side surface of the lens.

The portion of the barrier blade that may be disposed so as to cover the outer edge portion of the object side surface includes an inclined form that corresponds with a curved surface of the object side of the lens.

According to the third aspect of the present invention, an optical device comprising above lens barrel is provided.

According to the forth aspect of the present invention, an optical device comprising above lens barrel is provided.

The mechanisms described above may be suitably modified and at least portions thereof may be replaced with other structures.

According to the present invention, a lens barrel and an optical device that are reducible in size, in which a lens barrier and a lens are prevented from touching, may be provided.

BRIEF DESCRIPTION OF THE DRAWINGS

FIG. 12 is a diagram corresponding to FIG. 11 of a state in which the barrier blades are closed;

DETAILED DESCRIPTION OF THE PREFERRED EMBODIMENT

First Embodiment

Herebelow, a first embodiment of the present invention is described with reference to the attached drawings.

Figure 1:
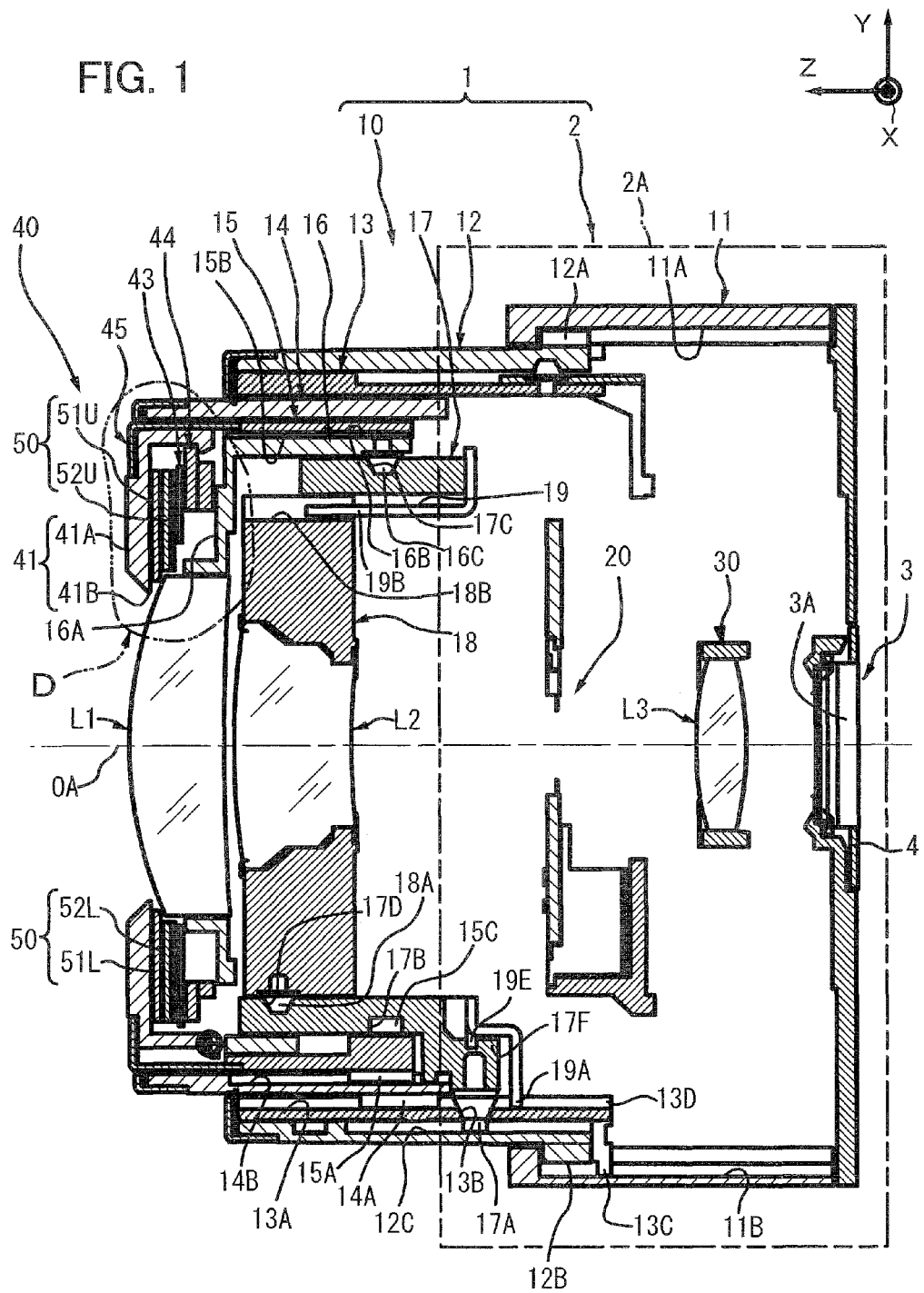
FIG. 1 is a diagram conceptually illustrating a vertical section of a camera of a first embodiment of the present invention, in a shooting standby state.
Figure 2:
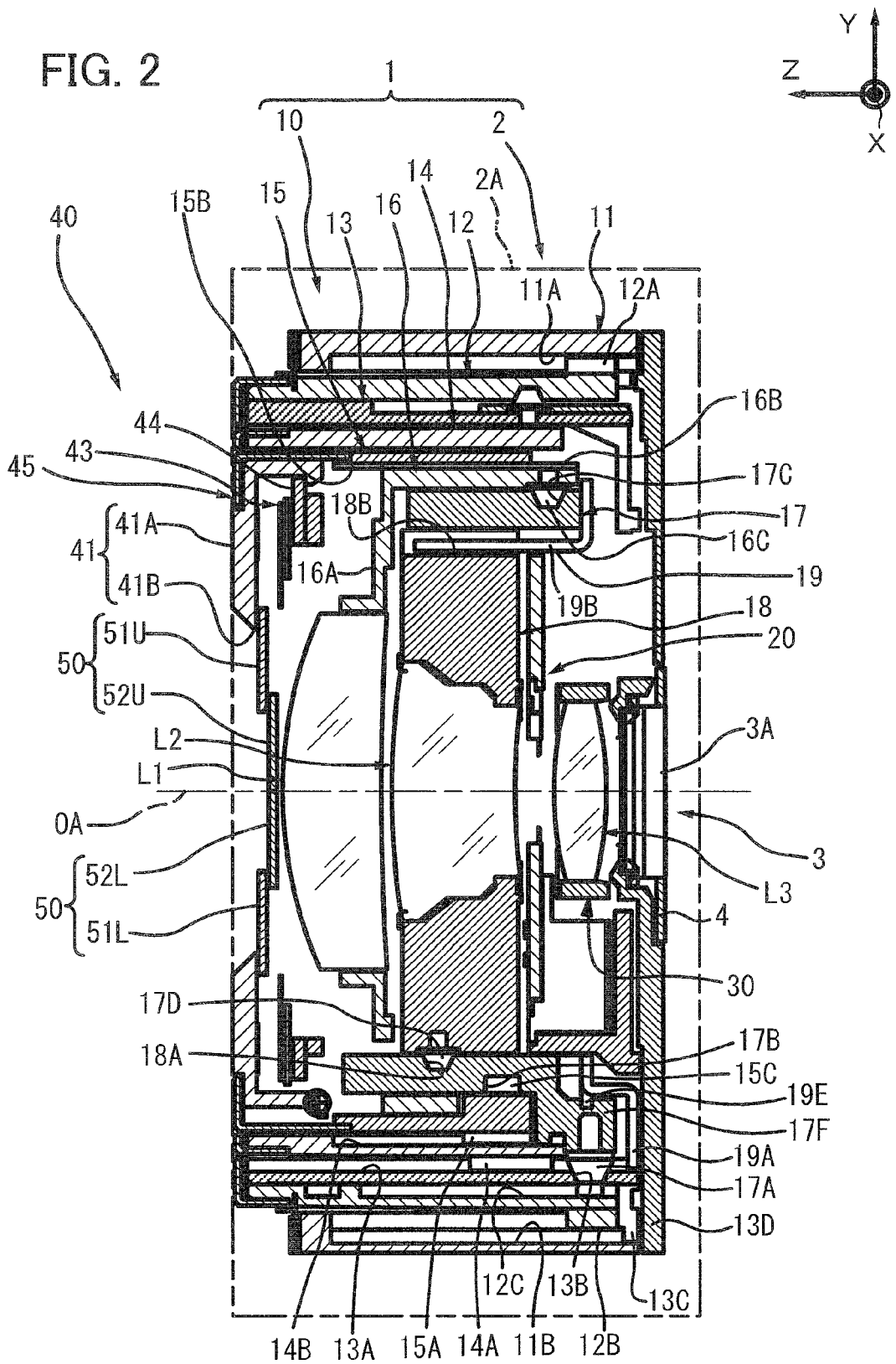
FIG. 2 is a diagram conceptually illustrating a vertical section of the camera, in which a lens barrel is in a collapsed state.

FIG. 1 is a diagram schematically illustrating a vertical section of a camera 1 in a shooting standby state. FIG. 2 is a diagram schematically illustrating a vertical section of the camera 1, in which a lens barrel 10 is in a collapsed state. The term "collapsed state" used herein is intended to include a state in which the lens barrel is retracted into the main body of the camera and a state in which the barrel is shortened.

In the drawings, in order to facilitate description and understanding, an orthogonal XYZ coordinate system is provided. In this co-ordinate system, for a position of the camera when a photographer is keeping an optical axis OA horizontal and photographing a landscape orientation image (hereinafter referred to as a usual position), a direction to leftward from the photographer's point of view is the X plus direction. The direction to upward in the usual position is the Y plus direction, and the direction toward the object in the usual position is the Z plus direction.

In the descriptions below, except where particularly stated otherwise, movement of a fixed optical system of the imaging optical system in a direction parallel with the optical axis OA is referred to as "translation", and movement about the optical axis OA is referred to as "rotation". The direction parallel to the optical axis OA of the imaging optical system is referred to as "front-rear", with the object side being referred to as "the front face side" and the imaging plane (imaging surface) side being referred to as "the rear face side".

The camera 1 is a digital camera constituted by a body unit 2 and the lens barrel 10.

The present invention is not to be limited to digital cameras and is also applicable to, for example, still cameras that use film.

The lens barrel 10 is so-called a collapsible zoom lens, which can be retracted into the body unit 2 when not being used, and which can protrude from the body unit 2 and alter the focusing distance (zooming) when in use. That is, in a non-shooting state in which an electricity supply is cut off, the lens barrel 10 is contracted and accommodated inside the body unit 2 as illustrated in FIG. 2. When electricity is supplied, the lens barrel 10 protrudes to the front face side of the body unit 2 and goes into an shooting standby state as illustrated in FIG. 1. In the mechanism of the present embodiment, the shooting standby state is set to the wide-angle end of the zoom range.

The body unit 2 is provided with a sensor unit 3 inside a body casing 2A.

The sensor unit 3 is provided with an imaging device 3A such as a CCD or the like. The sensor unit 3 is fixed to a CCD mount 4 in an attitude in which the imaging surface of the imaging device 3A is orthogonal to the optical axis OA of the lens barrel 10. The imaging plane is set to a landscape orientation with a predetermined aspect ratio. The term "landscape orientation" used herein is intended to include a length in the X direction being longer than a length in the Y direction. The sensor unit 3 converts an image imaged on the imaging surface of the imaging device 3A by the lens barrel 10 to electronic signals and outputs the electronic signals.

As mentioned above, the lens barrel 10 is a zoom lens whose focusing distance is alterable. The lens barrel 10 is provided with three lens units (a first lens unit L1, a second lens unit L2 and a third lens unit L3) that constitute a focusing optical system of the camera 1. These three lens units focus an object image onto the imaging surface of the imaging device 3A of the sensor unit 3. The lens barrel 10 moves each of the lens units L1, L2 and L3 along the optical axis OA direction to alter the focusing distance. The third lens unit L3 is a focusing lens unit, which moves in the optical axis OA direction to alter the focusing position.

In the camera 1, the lens units provided in the lens barrel 10 (the first lens unit L1, the second lens unit L2 and the third lens unit L3) form an object image onto the light detection surface of the imaging device 3A of the sensor unit 3. When an unillustrated shutter button is pressed for operation by a photographer, image information of the object that has been converted to electronic signals by the sensor unit 3 is recorded in an unillustrated recording device (imaging). Control of all operations of the camera 1, including imaging, is conducted by an unillustrated control device inside the camera 1.

Figure 3:
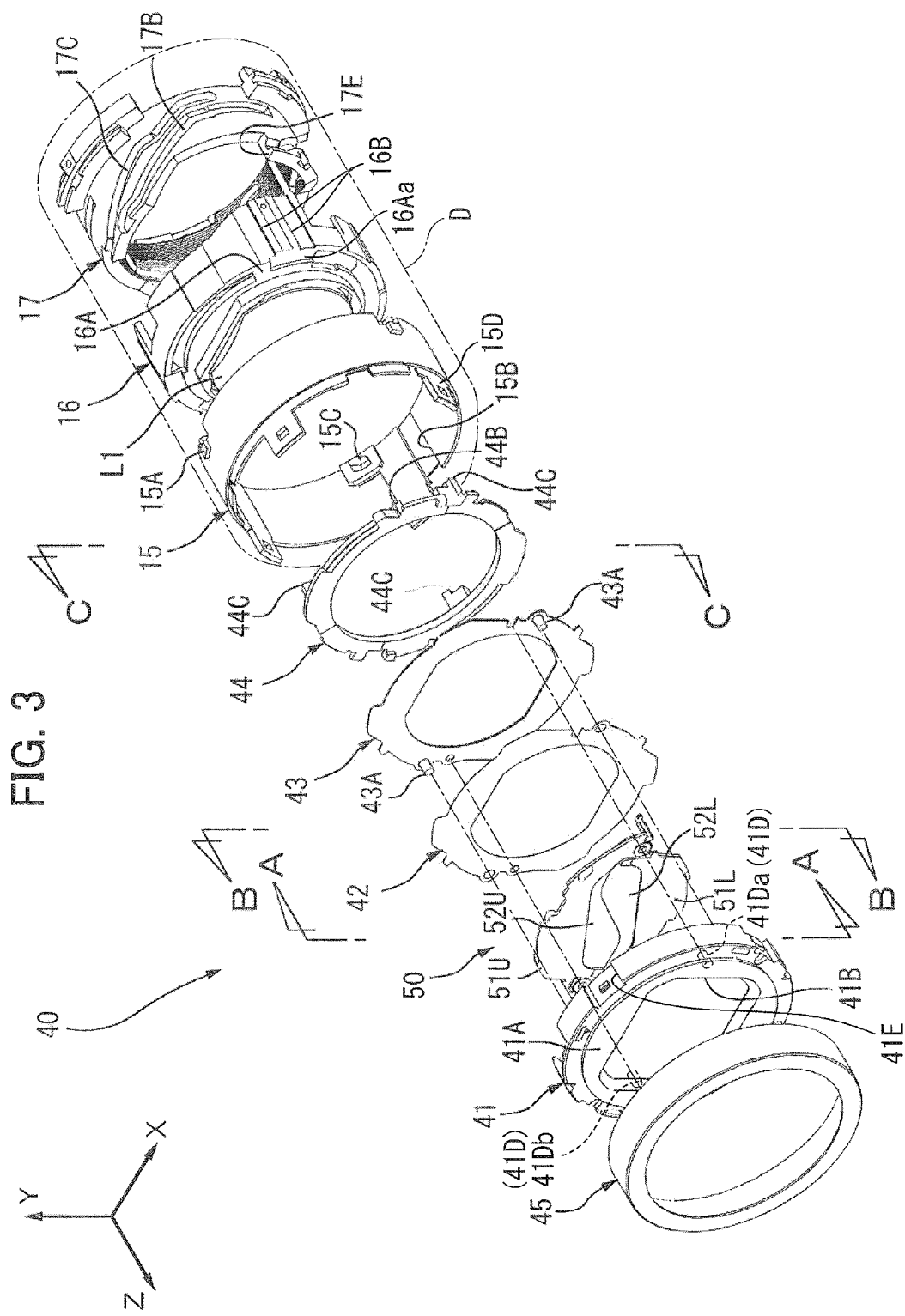
FIG. 3 is an exploded perspective diagram of a front face side portion of the lens barrel.
Figure 4:
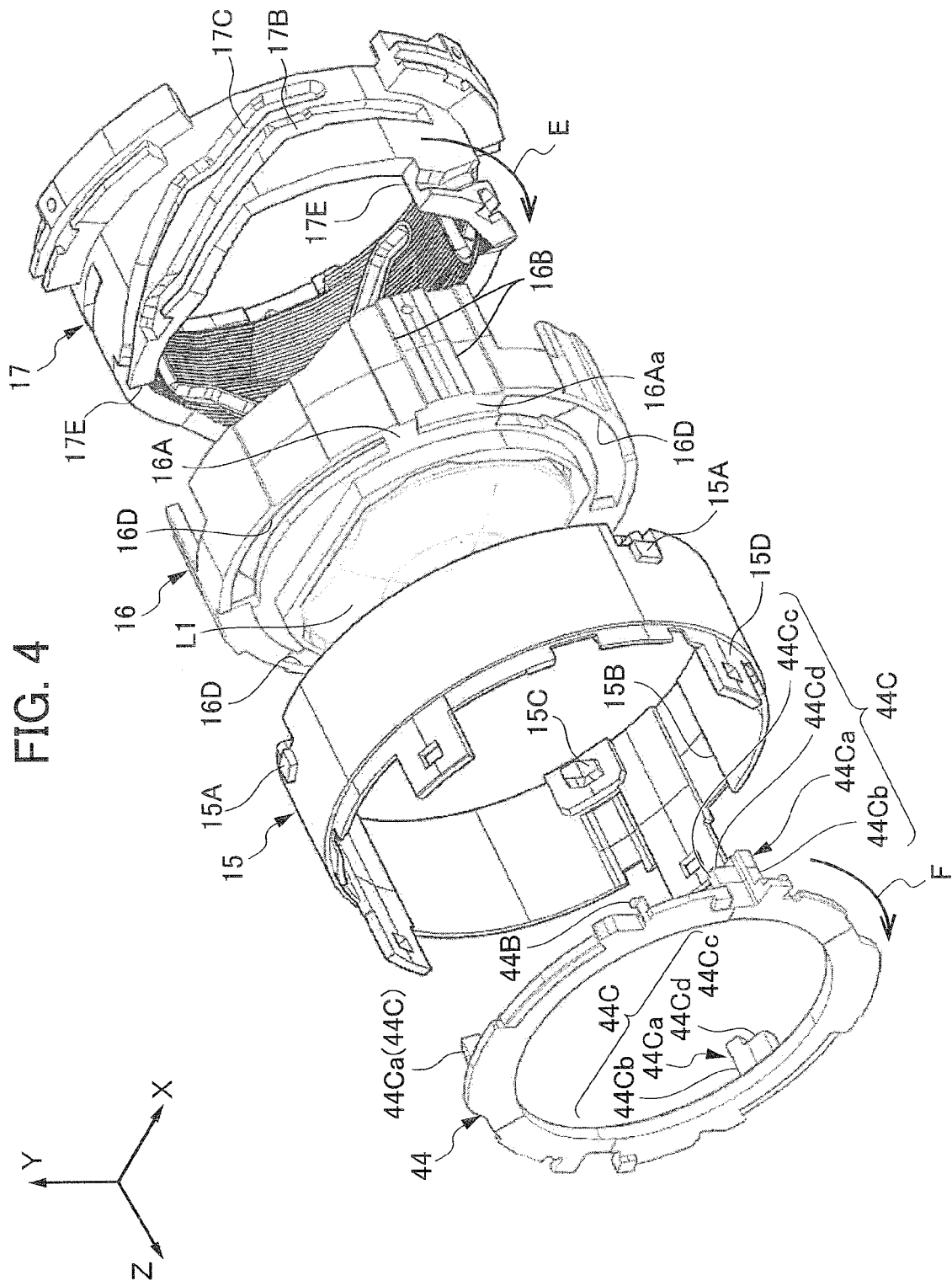
FIG. 4 is a magnified diagram of portion D of FIG. 3.
Figure 5:
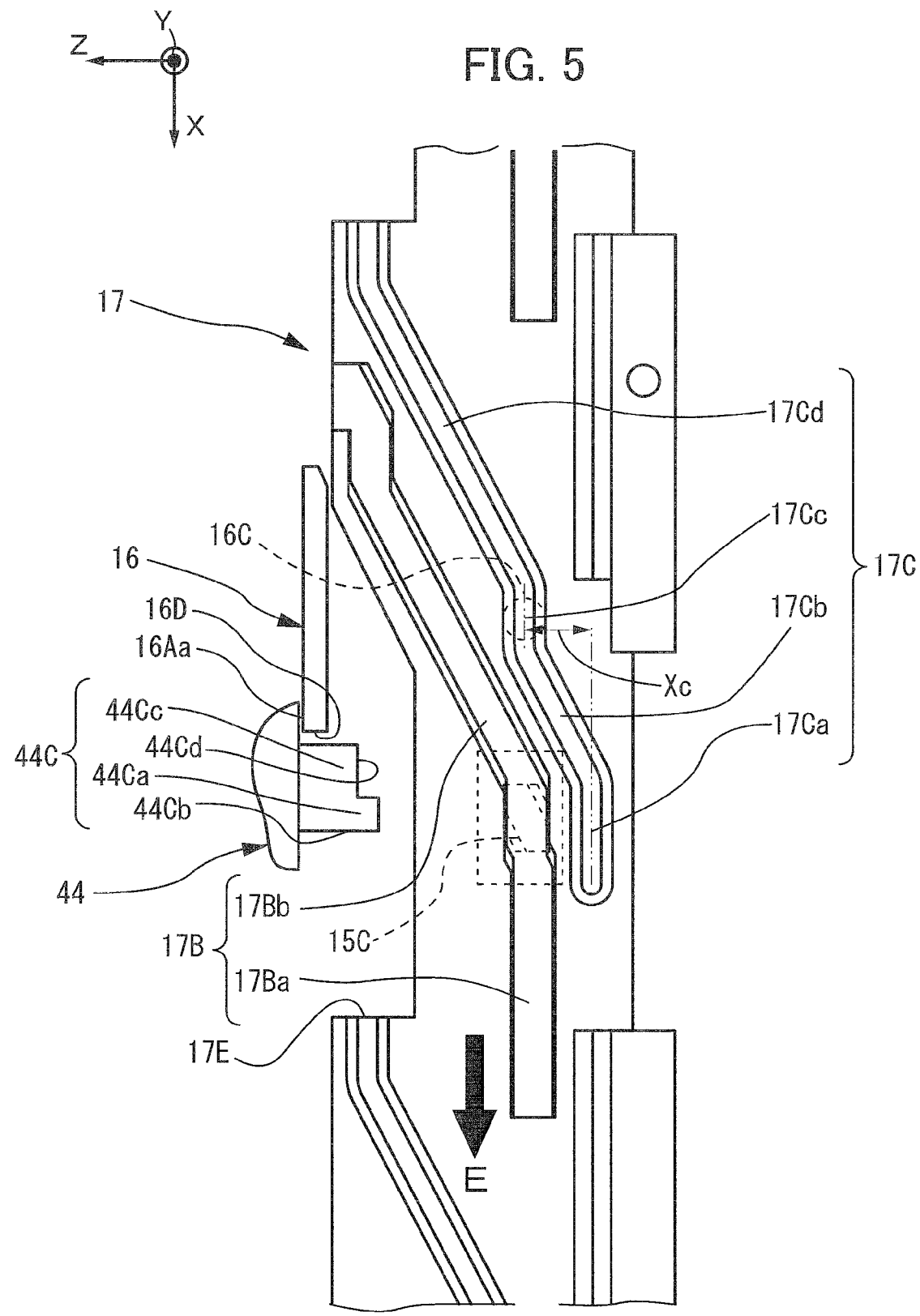
FIG. 5 is an expanded diagram of a cam tube periphery surface, describing a barrier tube helicoid groove and a lens chamber driving cam groove of the cam tube.

Next, the lens barrel 10 is described in detail referring to the above-mentioned FIG. 1 and FIG. 2 and also to FIG. 3 to FIG. 6. FIG. 3 is an exploded perspective diagram of a portion with a barrier tube 15, a first lens chamber 16, a cam tube 17 and a barrier mechanism 40. FIG. 4 is a magnified diagram of portion D of FIG. 3. FIG. 5 is an expanded diagram of a periphery surface of the cam tube 17, describing a barrier tube helicoid groove 17B and a lens chamber driving cam groove 17C of the cam tube 17. FIG. 6A to FIG. 6C are diagrams describing movement restriction of the first lens chamber 16 by a coupling plate 44 of the barrier mechanism 40 when the barrier tube helicoid groove 17B and lens chamber driving cam groove 17C of the cam tube 17 operate. FIG. 6A shows the shooting standby state, FIG. 6S shows a locked state and FIG. 6C shows a collapsed state.

As illustrated in FIG. 1 and FIG. 2, in the lens barrel 10, a fixed tube 11 is structured integrally with the body casing 2A. Inside the fixed tube 11, a rotation tube 12, a translation tube 13, a first unit translation tube 14 and the barrier tube 15 are arranged in multiple stages, in order of decreasing diameter in the Y direction. The first lens chamber 16 is fitted into the inner periphery side of the barrier tube 15, and the cam tube 17 is disposed at the inner periphery side of the first lens chamber 16. A second lens frame 18 is disposed at the inner periphery side of the first lens chamber 16, and a shutter mechanism 20 and a third lens frame 30 are disposed at the rear face side of the second lens frame 18. The barrier mechanism 40 is provided at the front face side of the barrier tube 15. The barrier mechanism 40 includes opening and closing barrier blades 50 and is structured to include the barrier tube 15.

The lens barrel 10 contracts and extends between the shooting standby state, in which the rotation tube 12 (the translation tube 13) and the first unit translation tube 14 protrude by predetermined amounts from the fixed tube 11 as illustrated in FIG. 1, and the collapsed state, in which the rotation tube 12 and the first unit translation tube 14 are almost entirely accommodated in the fixed tube 11 as illustrated in FIG. 2. The shooting standby state illustrated in FIG. 1 is at the point in the zoom range that is furthest to the wide-angle side (the end at which the focusing distance is shortest). From this state, the lens units L1, L2 and L3 move further in the optical axis OA direction to implement zooming to the long focus side.

Herebelow, constituent elements of the lens barrel 10 are described in order.

The fixed tube 11 is a cylinder with a predetermined length in the optical axis OA direction, and is structured integrally with the body casing 2A.

A rotation tube driving helicoid groove 11A and a translation groove 11B are formed at the inner periphery face of the fixed tube 11. The rotation tube driving helicoid groove 11A drives movements of the rotation tube 12, and the translation groove 11B guides movements of the translation tube 13. In the present embodiment, the translation groove 11B and the rotation tube driving helicoid groove 11A are each formed in, for example, a set of three in the circumferential direction.

Each rotation tube driving helicoid groove 11A is formed at a predetermined angle with respect to the optical axis OA (in a helical form whose position in the optical axis OA direction displaces along the circumferential direction). A driving pin 12A that protrudes from the outer periphery of the rotation tube 12 slidably fits into the rotation tube driving helicoid groove 11A.

Each translation groove 11B is formed in parallel with the optical axis OA (in the Z direction). A translation guiding protrusion 13C of the translation tube 13, which is described below, slidably fits into the translation groove 11B.

The rotation tube 12 is disposed at the inner periphery side of the fixed tube 11.

The rotation tube 12 is a cylinder that slidably fits into the inner periphery of the fixed tube 11, and is formed with a predetermined length in the optical axis OA direction.

The driving pins 12A that slidably fit into the rotation tube driving helicoid grooves 11A are provided protruding from the outer periphery of the rotation tube 12.

A drive input gear 12B is formed at the outer periphery of a rear face side end portion of the rotation tube 12. The drive input gear 12B is linked to an unillustrated collapse/zoom driving motor via a gear train. Accordingly, the rotation tube 12 is driven to rotate by the collapse/zoom driving motor.

A translation linking groove 12C is formed at the inner periphery face of the rotation tube 12. The translation linking groove 12C operates to move the cam tube 17 and guides movements thereof.

The translation linking groove 12C is formed in parallel with the optical axis OA. The translation linking groove 12C is formed in a set of, for example, three, with a predetermined spacing in the circumferential direction. A follower pin 17A that is implanted at the cam tube 17, which is described below, slidably fits into each translation linking groove 12C.

When the rotation tube 12 that is configured as described above is driven to rotate by the collapse/zoom driving motor, the rotation tube driving helicoid grooves 11A of the fixed tube 11, into which the driving pins 12A fit, are operated to translate. Thus, the rotation tube 12 translates while rotating.

The translation tube 13 is disposed at the inner periphery side of the rotation tube 12.

The translation tube 13 is a cylinder that slidably fits into the inner periphery of the rotation tube 12, is formed with a predetermined length in the optical axis OA direction, and is configured to be relatively rotatable with respect to the rotation tube 12 but relatively immovable in the translation direction.

A translation groove 13A is formed in parallel with the optical axis OA in the inner periphery of the translation tube 13. A translation guide 14A that is provided protruding from the outer periphery of the first unit translation tube 14, which is described below, is slidably fitted into the translation groove 13A.

A cam hole 13B is formed in the translation tube 13. The cam hole 13B is formed at a predetermined angle with respect to the optical axis OA and penetrates through the translation tube 13 from inside to outside in the radial direction. The follower pin 17A of the cam tube 17, which is described below, slidably fits into the cam hole 13B.

Each translation guiding protrusion 13C is provided protruding from the outer periphery side of a rear face side end portion of the translation tube 13. The translation guiding protrusion 13C slidably fits into the translation groove 11B of the fixed tube 11.

In the translation tube 13 that is configured as described above, because the translation guiding protrusions 13C fit into the translation grooves 11B of the fixed tube 11, when the rotation tube 12 translates while rotating, the translation tube 13 follows the rotation tube 12 and translates along with the rotation tube 12, without rotating.

The first unit translation tube 14 is disposed at the inner periphery side of the translation tube 13.

The first unit translation tube 14 is a cylinder that slidably fits into the inner periphery of the translation tube 13, and is formed with a predetermined length in the optical axis OA direction.

The translation guide 14A is formed at the outer periphery of the first unit translation tube 14. The translation guide 14A slidably fits into the translation groove 13A of the translation tube 13.

Translation guide grooves 14B are formed at the inner periphery of the first unit translation tube 14. Each translation guide groove 14B is formed in parallel with the optical axis OA. A guide protrusion 15A that is provided protruding from the outer periphery of the barrier tube 15, which is described below, slidably fits into the translation guide groove 14B.

An end portion at the rear face side of the first unit translation tube 14 engages with the cam tube 17, which is described below, to be immovable in the optical axis OA direction but capable of relative rotation.

The first unit translation tube 14 configured as described above is provided to be relatively rotatable but immovable in the optical axis OA direction with respect to the cam tube 17 described below. Because the translation guide 14A fits into the translation groove 13A of the translation tube 13, the first unit translation tube 14 translates along with the cam tube 17 without rotating.

The barrier tube 15 is disposed at the inner periphery of the first unit translation tube 14.

The barrier tube 15 is a cylinder that slidably fits into the inner periphery of the first unit translation tube 14, and is formed with a predetermined length in the optical axis OA direction. The barrier tube 15 constitutes a portion of the barrier mechanism 40 that, as mentioned above, is provided with the opening and closing barrier blades 50.

The guide protrusions 15A are provided protruding from the outer periphery of the barrier tube 15. Each guide protrusion 15A slidably fits into the translation guide groove 14B of the first unit translation tube 14.

Lens guide grooves 15B are formed in parallel with the optical axis OA at the inner periphery of the barrier tube 15. A guide projection 16B that is formed at the outer periphery of the first lens chamber 16, which is described below, slidably fits into each lens guide groove 15B.

Driven keys 15C are provided protruding from a vicinity of a rear face side end portion of the inner periphery of the barrier tube 15. Each driven key 150 slidably fits into the barrier tube helicoid groove 17B formed at the outer periphery of the cam tube 17, which is described below.

In the barrier tube 15 that is configured as described above, because each guide protrusion 15A fits into the translation guide groove 14B of the first unit translation tube 14, each driven key 150 is operated by the barrier tube helicoid groove 17B of the cam tube 17 and the barrier tube 15 translates in accordance with rotation of the cam tube 17, without rotating.

The barrier mechanism 40 including the barrier tube 15 is described below.

The first lens chamber 16 is disposed at the inner periphery side of the barrier tube 15.

The first lens chamber 16 is a cylinder that slidably fits into the inner periphery of the barrier tube 15, and is formed with a predetermined length in the optical axis OA direction. The first lens chamber 16 supports the first lens unit L1 with a flange-form support portion 16A that is provided protruding from the inner periphery side at the front face side of the first lens chamber 16.

As illustrated in FIG. 4, a fitting hole 16D is formed in the support portion 16A at three locations that are equally spaced in the circumferential direction (at 120° intervals). An operated/restrict protrusion 44C of the coupling plate 44 of the barrier mechanism 40, which is described below, is inserted into each fitting hole 16D.

Each fitting hole 16D is a long hole with a predetermined angular range in the circumferential direction. A portion of the support portion 16A that is adjacent to an anticlockwise direction forward side edge of each fitting hole 16D as viewed from the front face side serves as a movement restrict portion 16Aa, which is a flat surface orthogonal to the optical axis OA. The position of each movement restrict portion 16Aa is specified such that a restrict surface 44Cd of a lens restrict protrusion portion 44Cc of the coupling plate 44 of the barrier mechanism 40, which is described below, opposes the movement restrict portion 16Aa in the collapsed state, and opposes the fitting hole 16D during shooting standby. The movement restrict portions 16Aa cooperate with the operated/restrict protrusions 44C of the coupling plate 44 of the barrier mechanism 40 that is described below (the lens restrict protrusion portions 44Cc), and prevent the first lens unit L1 abutting against the barrier blades 50 if there is a problem with opening of the barrier blades 50. This operation will be described below.

Each guide projection 16B is protrudingly provided in parallel with the optical axis OA at the outer periphery of the first lens chamber 16. The guide projection 168 slidably fits into the lens guide groove 15B of the barrier tube 15.

Cam followers 16C are provided protruding from the inner periphery of the first lens chamber 16. Each cam follower 16C slidably fits into the lens chamber driving cam groove 17C formed at the outer periphery of the cam tube 17, which is described below.

In the first lens chamber 16 that is configured as described above, the cam follower 16C is operated by the lens chamber driving cam groove 17C of the cam tube 17, and because the guide projection 16B fits into the lens guide groove 15B of the barrier tube 15, the first lens chamber 16 translates without rotating in accordance with rotation of the cam tube 17.

If the first lens unit L1 that is supported by the first lens chamber 16 is viewed from the front face side, a front face portion of the first lens unit L1 has a shape in which an upper portion and a lower portion of the first lens unit L1 are cut down in accordance with the landscape orientation imaging surface with the predetermined aspect ratio of the above-mentioned imaging device 3A of the sensor unit 3 (see FIG. 4).

That is, the upper and lower edges of the first lens unit L1 (the two ends in the Y direction) are formed in parallel straight line shapes, and left and right edges of the first lens unit L1 (the two ends in the X direction) have circular arc shapes (herebelow, this shape is referred to as a barrel-shape).

The above-mentioned barrel-shape in a predetermined XY plane is a shape that is symmetrical about a straight line in the predetermined XY plane that is parallel with the X axis and orthogonal to the optical axis OA.

The upper and lower cut-offs of the front face portion of the first lens unit L1 are applied in order to form spaces for accommodating the barrier blades 50 of the barrier mechanism 40, which is described below, above and below the first lens unit L1.

Thus, as will be described below, the first lens unit L1 may be maximally projected to the front face side (the object side) and a wide angle of view may be provided, while an increase in the external diameter of the lens barrel 10 is restrained.

The cam tube 17 is disposed at the inner periphery side of the first lens chamber 16.

The cam tube 17 is a cylinder that slidably fits into the inner periphery of the first lens chamber 16, and is formed with a predetermined length in the optical axis OA direction.

The follower pin 17A is provided protruding from a vicinity of a rear face side end portion of the outer periphery of the cam tube 17. The follower pin 17A fits into and penetrates through the cam hole 13B of the translation tube 13, and the distal end of each follower pin 17A slidably fits into the translation linking groove 12C of the rotation tube 12.

The barrier tube helicoid groove 17B and the lens chamber driving cam groove 17C are formed at the outer periphery of the cam tube 17, as illustrated in FIG. 5 and FIG. 6A to FIG. 6C, in which the outer periphery face of the cam tube 17 is shown as if straightened out. In the present embodiment, each of the barrier tube helicoid groove 17B and the lens chamber driving cam groove 17C is formed in a set of three in the circumferential direction.

Each driven key 15C of the barrier tube 15 slidably fits into the barrier tube helicoid groove 17B, and each cam follower 16C of the first lens chamber 16 slidably fits into the lens chamber driving cam groove 17C. The barrier tube helicoid groove 17B and the lens chamber driving cam groove 17C are described below.

A second lens frame driving cam groove 177 is formed at the inner periphery of the cam tube 17. The second lens frame driving cam groove 17D is formed at a predetermined angle with respect to the optical axis OA. A second lens frame cam follower 18A that is provided protruding from the outer periphery of the second lens frame 18, which is described below, slidably fits into the second lens frame driving cam groove 17D.

A barrier restrict surface 17E is formed at a front face edge of the cam tube 17. The barrier restrict surface 17E is a surface that faces to the anticlockwise forward side as viewed from the front face side, and is formed at three locations that are equally spaced in the circumferential direction (at 120° intervals). Each barrier restrict surface 17E abuts against the operated/restrict protrusion 44C of the coupling plate 44 of the barrier mechanism 40, which is described below, and operates rotation of the coupling plate 44.

In accordance with rotation of the rotation tube 12, the follower pin 17A of the cam tube 17 is operated to rotate by the translation linking groove 12C of the rotation tube 12, and the cam tube 17 is operated to translate by the cam hole 13B of the translation tube 13. That is, in accordance with rotation of the rotation tube 12, the cam tube 17 translates while rotating.

The cam tube 17, by rotating and translating, operates the barrier tube 15 to move via the driven key 15C fitted into each barrier tube helicoid groove 17B, operates the first lens chamber 16 to move via the cam follower 16C fitted into each lens chamber driving cam groove 17C, and operates the second lens frame 18 to move via the second lens frame cam follower 18A fitted into the second lens frame driving cam groove 170.

The cam tube 17 abuts against the operated/restrict protrusion 440 of the coupling plate 44 of the barrier mechanism 40 which is described below and the cam tube 17 operates to rotate the coupling plate 44, and the cam tube 17 operates driving to open and close the barrier blades 50 of the barrier mechanism 40.

The second lens frame 18 is disposed at the inner periphery face of the cam tube 17.

The second lens frame 18 is a cylinder that slidably fits into the inner periphery of the cam tube 17, and is formed with a predetermined length in the optical axis OA direction. The inner periphery of the second lens frame 18 supports the second lens unit L2.

The second lens frame cam follower 18A is provided protruding from the outer periphery of the second lens frame 18. The second lens frame cam follower 18A slidably fits into the second lens frame driving cam groove 17D of the cam tube 17.

A translation guide groove 18B is also formed at the outer periphery of the second lens frame 18. A key portion 19B of a translation key 19, which is described below, slidably fits into the translation guide groove 18B.

The second lens frame 18 that is configured as described above, the second lens frame cam follower 18A is operated by the second lens frame driving cam groove 17D of the cam tube 17 and, because the translation key 19 fits into the translation guide groove 18B, the second lens frame 18 translates, without rotating, in accordance with rotation of the cam tube 17.

The translation key 19 is provided with a translation fitting portion 19A and the key portion 19B, which extends to the front face side. The translation fitting portion 19A slidably fits into a translation key groove 13D provided at the translation tube 13. The key portion 19B slidably fits into the translation guide groove 18B of the second lens frame 18 as mentioned above A cam side bayonet recess portion 17F is provided at the inner radial side of the follower pin 17A that is implanted at the cam tube 17. Correspondingly, a key side projection portion 19E is provided at the translation key 19.

The key side projection portion 19E bayonet-couples with the cam side bayonet recess portion 17F. Thus, the cam side bayonet recess portion 17F and the key side projection portion 19E are bayonet-coupled. Therefore, the translation key 19 moves in the optical axis direction together with the cam tube 17, but rotation of the translation key 19 is prevented by the translation key groove 13D and the translation fitting portion 19A fitting together.

The second lens frame cam follower 18A of the second lens frame 18 is operated by the second lens frame driving cam groove 17D of the cam tube 17, and the translation key 19 fits into the translation guide groove 18B. Therefore, the second lens frame 18 translates, without rotating, in accordance with rotation of the cam tube 17.

The lens barrel 10 that is configured as described above, when the rotation tube 12 is driven to rotate by the unillustrated collapse/zoom driving motor, the rotation tube 12 is operated to translate by the rotation tube driving helicoid groove 11A of the fixed tube 11 into which the driving pin 12A fits. That is, the rotation tube 12 translates while rotating.

Because the translation guiding protrusion 13C of the translation tube 13 fits into the translation groove 11B of the fixed tube 11, the translation tube 13 translates along with the rotation tube 12, without rotating.

When rotation tube 12 rotates, each follower pin 17A of the cam tube 17 is operated to rotate by the translation linking groove 12C of the rotation tube 12, and the cam tube 17 is operated to translate by the cam hole 13B of the translation tube 13. Thus, in accordance with rotation of the rotation tube 12, the cam tube 17 translates while rotating.

The first unit translation tube 14 is provided to be relatively rotatable with respect to the cam tube 17 but immovable in the optical axis direction. Because the translation guide 14A of the first unit translation tube 14 fits into the translation groove 13A of the translation tube 13, the first unit translation tube 14 translates along with the cam tube 17, without rotating.

Because the guide protrusion 15A of the barrier tube 15 fits into the translation guide groove 14B of the first unit translation tube 14, the barrier tube 15 is operated by the barrier tube helicoid groove 17B of the cam tube 17 into which the driven key 15C fits, and the barrier tube 15 translates in accordance with the rotation of the cam tube 17, without rotating.

Each cam follower 16C of the first lens chamber 16 is operated by the lens chamber driving cam groove 17C of the cam tube 17, and because the guide projection 16B fits into the lens guide groove 15B of the barrier tube 15, the first lens chamber 16 translates in accordance with the rotation of the cam tube 17, without rotating.

The second lens frame cam follower 18A of the second lens frame 18 is operated by the second lens frame driving cam groove 17D of the cam tube 17, and because the translation key 19 fits into the translation guide groove 18B, the second lens frame 18 translates in accordance with rotation of the cam tube 17, without rotating.

By the operations described above, the lens barrel 10 contracts and extends between the shooting standby state, in which the rotation tube 12 (the translation tube 13) and the first unit translation tube 14 protrude by predetermined amounts from the fixed tube 11 as illustrated in FIG. 1, and the collapsed state, in which the rotation tube 12 and the first unit translation tube 14 are almost completely accommodated in the fixed tube 11 as illustrated in FIG. 2. As mentioned above, each of the lens units L1, L2 and L3 can move further in the optical axis OA direction beyond the shooting standby state illustrated in FIG. 1 to perform zooming to the long focus side.

In the shooting standby state illustrated in FIG. 1, the rotation tube 12 (the translation tube 13) protrudes by a predetermined amount from the fixed tube 11, and the first unit translation tube 14 protrudes by a predetermined amount from the rotation tube 12. The front face of the barrier mechanism 40 described below that is provided at the front face side of the barrier tube 15 substantially coincides with the front face of the first unit translation tube 14, and the barrier blades 50 are in the opened state.

In the collapsed state illustrated in FIG. 2, the front faces of the rotation tube 12 (the translation tube 13) and the first unit translation tube 14 are in a coinciding state, protruding by a predetermined amount from the front face of the fixed tube 11. The front face of the barrier mechanism 40 also substantially coincides with the front faces of the rotation tube 12 and the first unit translation tube 14, and the barrier blades 50 are in the closed state.

The barrier tube 15 and the first lens chamber 16 are both driven to move by the cam tube 17, but movement amounts of the two between the shooting standby state and the collapsed state are different, with the first lens chamber 16 moving more than the barrier tube 15. Thus, between the shooting standby state and the collapsed state, the first lens unit L1 that is retained by the first lens chamber 16 relatively moves between the front and rear of the barrier blades 50 provided at the barrier tube 15.

In the shooting standby state illustrated in FIG. 1, the front face of the first lens unit L1 retained by the first lens chamber 16 protrudes to the front face side relative to inner blades of the barrier blades 50 (an upper inner blade 52U and a lower inner blade 52L) of the barrier mechanism 40 which are in the opened state. On the other hand, in the collapsed state illustrated in FIG. 2, the front face of the first lens unit L1 is disposed at the rear face side relative to the inner blades (the upper inner blade 52U and lower inner blade 52L) of the barrier blades 50.

Thus, in the shooting standby state, the front face of the first lens unit L1 protrudes to the front face side beyond the barrier blades 50 and provides a wider angle of view, while closure of the barrier blades 50 is possible in the collapsed state.

As mentioned above, these movements of the barrier tube 15 and the first lens chamber 16 are regulated by the barrier tube helicoid grooves 17B and the lens chamber driving cam grooves 17C.

Next, each barrier tube helicoid groove 17B and lens chamber driving cam groove 17C is described in detail referring to FIG. 5 and FIG. 6.

The barrier tube helicoid groove 17B is provided with a collapse and extension restrict portion 17Ba and an extension restrict portion 17Bb. The collapse and extension restrict portion 17Ba extends in a direction orthogonal to the optical axis OA. The extension restrict portion 17Bb is continuous with the collapse and extension restrict portion 17Ba and extends to the front face side at a predetermined angle with respect to the optical axis OA.

Figure 6A:
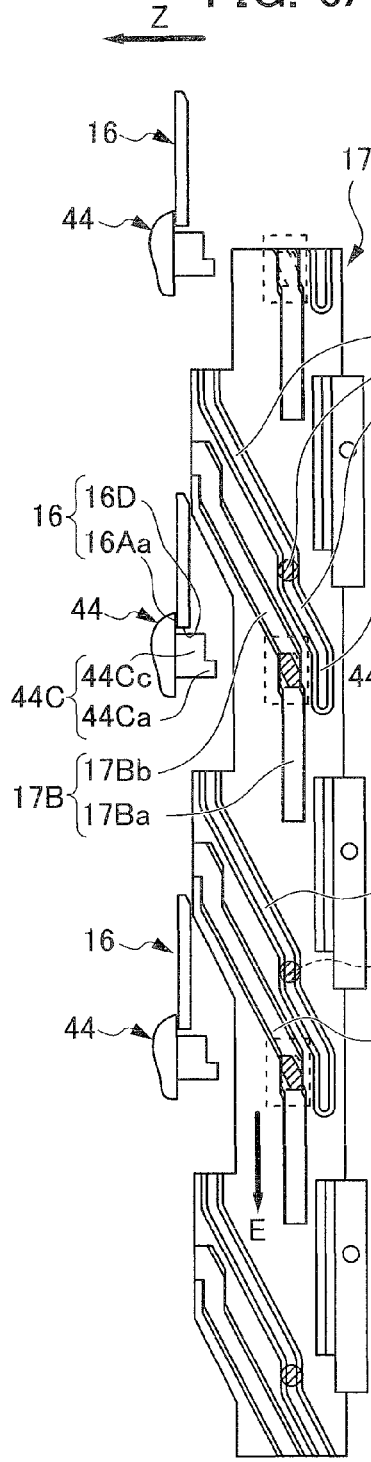
FIG. 6A is a diagram describing operation of the barrier tube helicoid groove and lens chamber driving cam groove of the cam tube and movement restriction of a first lens chamber by a coupling plate, showing the shooting standby state.
Figure 6B:
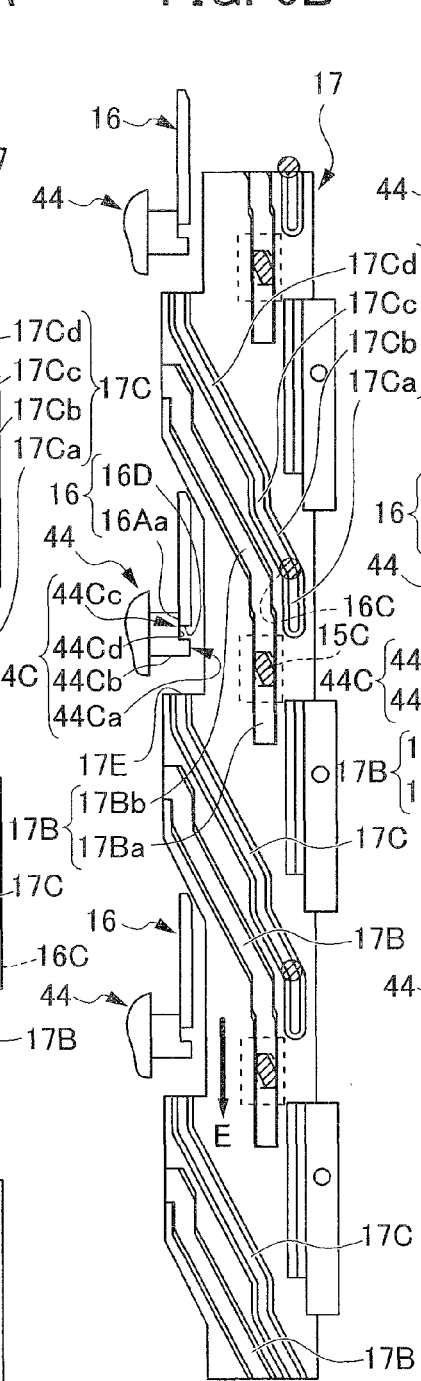
FIG. 6B is a diagram describing operation of the barrier tube helicoid groove and lens chamber driving cam groove of the cam tube, and movement restriction of the first lens chamber by the coupling plate, showing a locked state.

The driven key 15C of the barrier tube 15 slidably fits into the barrier tube helicoid groove 17B. The driven key 15C is specified so as to move along the collapse and extension restrict portion 17Ba between the collapsed state illustrated in FIG. 6C and the shooting standby state illustrated in FIG. 6A, and so as to move along the extension restrict portion 17Bb during zooming beyond the shooting standby state. Thus, from the collapsed state to the shooting standby state, the barrier tube 15 advances along with the cam tube 17 but does not advance with respect to the cam tube 17. In the shooting standby state, the driven key 15C is disposed at a turning portion between the collapse and extension restrict portion 17Ba and the extension restrict portion 17Bb, as illustrated in FIG. 5 and FIG. 6A.

The lens chamber driving cam groove 170 is provided with a collapse base portion 17Ca, a collapse and extension restrict portion 17Cb, a standby base portion 17Cc and a zoom restrict portion 17Cd. The collapse base portion 17Ca extends in an advance driving direction orthogonal to the optical axis OA. The collapse and extension restrict portion 17Cb is continuous with the collapse base portion 17Ca and extends to the front face side in parallel with the extension restrict portion 17Bb of the barrier tube helicoid groove 17B. The standby base portion 17Cc is continuous with a distal end of the collapse and extension restrict portion 17Cb and extends in the direction orthogonal to the optical axis OA. The zoom restrict portion 17Cd is continuous with the standby base portion 17Cc and extends to the front face side in parallel with the extension restrict portion 17Bb of the barrier tube helicoid groove 17B. A gap between the zoom restrict portion 17Cd and the extension restrict portion 17Bb is wider than a gap between the collapse and extension restrict portion 17Cb and the extension restrict portion 17Bb by an amount corresponding to the length of the standby base portion 17Cc.

The cam follower 16C of the first lens chamber 16 slidably fits into the lens chamber driving cam groove 17C. Between the collapsed state illustrated in FIG. 6C and the shooting standby state illustrated in FIG. 6A, the cam follower 16C moves along the collapse and extension restrict portion 17Cb from the collapse base portion 17Ca, and is disposed at the standby base portion 17Cc in the shooting standby state. The cam follower 16C is also specified so as to move along the zoom restrict portion 17Cd during zooming beyond the image standby state.

That is, because the cam follower 16C moves along the collapse and extension restrict portion 17Cb from the collapsed state to the shooting standby state, the cam follower 16C is operated to translate to the front face side by an amount corresponding to the displacement of the collapse and extension restrict portion 17Cb in the X direction (indicated with Xc in FIG. 5). Therefore, the first lens chamber 16 (the first lens unit L1) advances with respect to the cam tube 17 and the barrier tube 15 between the collapsed state and the shooting standby state.

As described above, when the cam tube 17 rotates from the collapsed state to the shooting standby state, the barrier tube 15 does not advance with respect to the cam tube 17 but the first lens chamber 16 is operated to advance by the collapse and extension restrict portions 17Cb. Thus, the first lens chamber 16 advances with respect to the barrier tube 15. Therefore, as described above, in the collapsed state illustrated in FIG. 2, the front face of the first lens unit L1 retained by the first lens chamber 16 is disposed at the rear face side relative to the inner blades of the barrier blades 50 (the upper inner blade 52U and the lower inner blade 52L), and in the shooting standby state illustrated in FIG. 1, the front face of the first lens unit L1 protrudes to the front face side relative to the inner blades of the barrier blades 50 (the upper inner blade 52U and the lower inner blade 52L) of the barrier mechanism 40 which are in the opened state.

Now the barrier mechanism 40 is described in detail referring to the above-mentioned FIG. 1 to FIG. 6C and also to FIG. 7 to FIG. 13.

Figure 7:
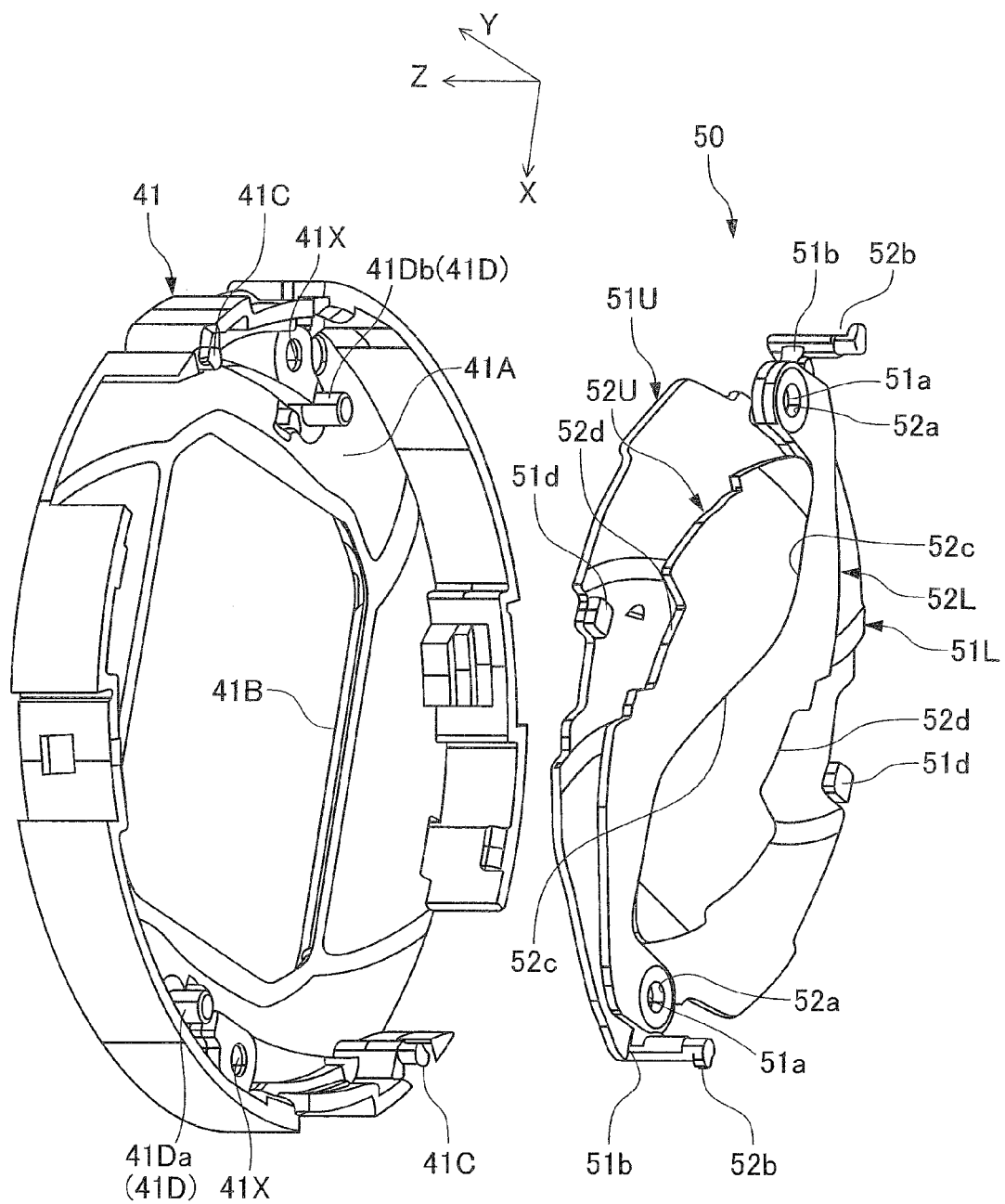
FIG. 7 is an exploded perspective diagram of a barrier frame and barrier blades.
Figure 8:
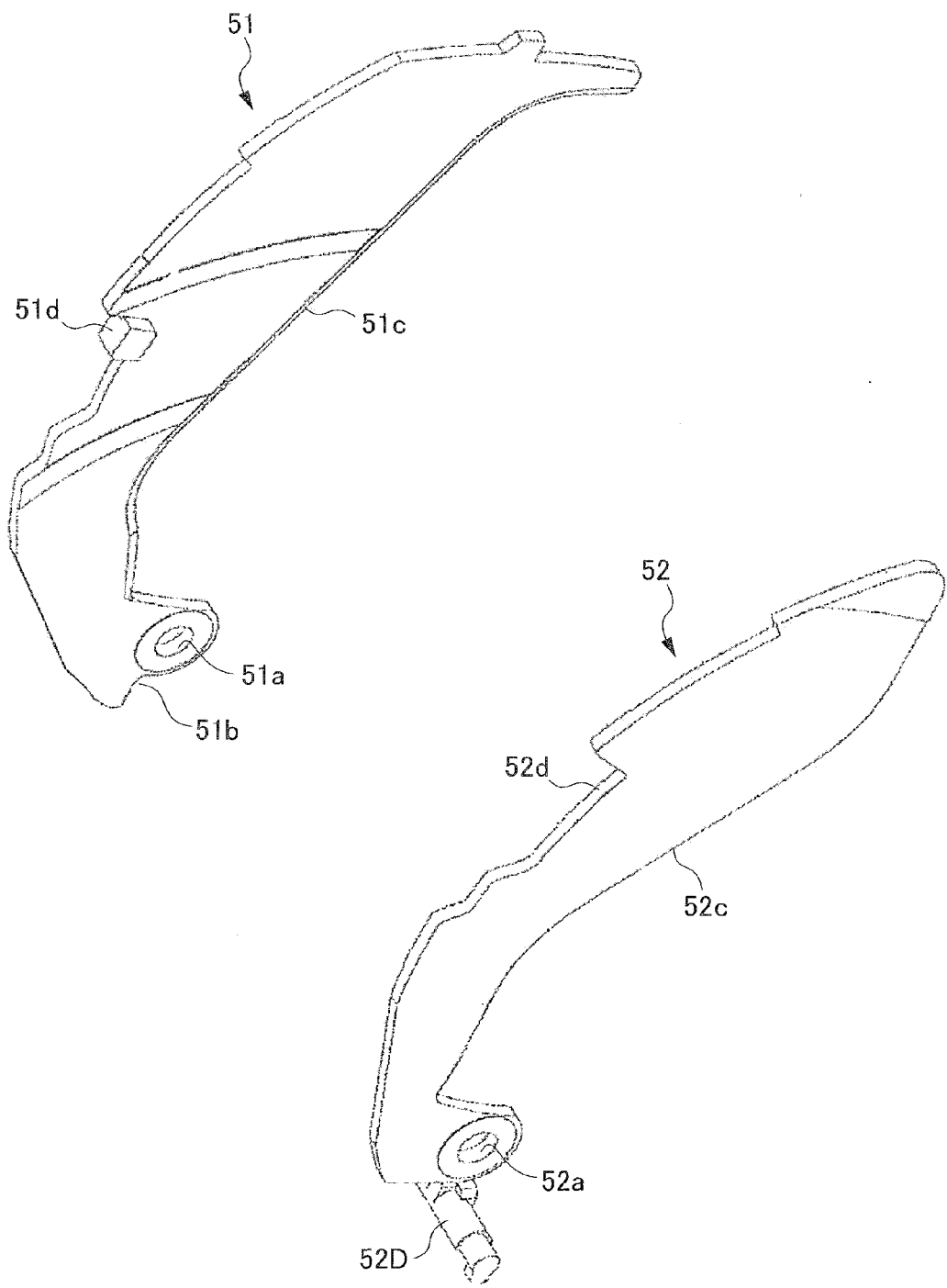
FIG. 8 is a perspective view of the barrier blades viewed from the imaging plane side.
Figure 9:
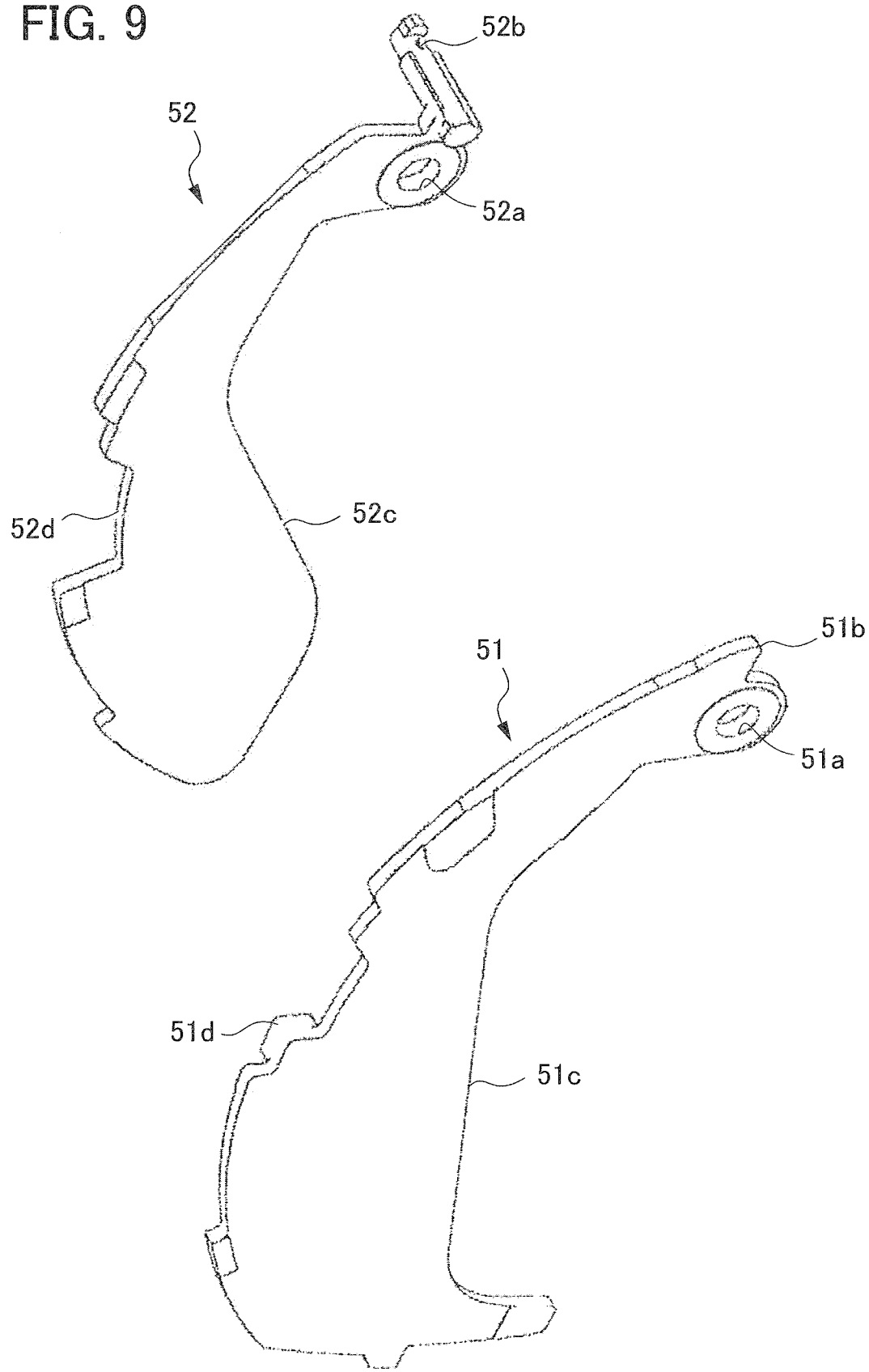
FIG. 9 is a perspective view of the barrier blades viewed from the object side.
Figure 10:
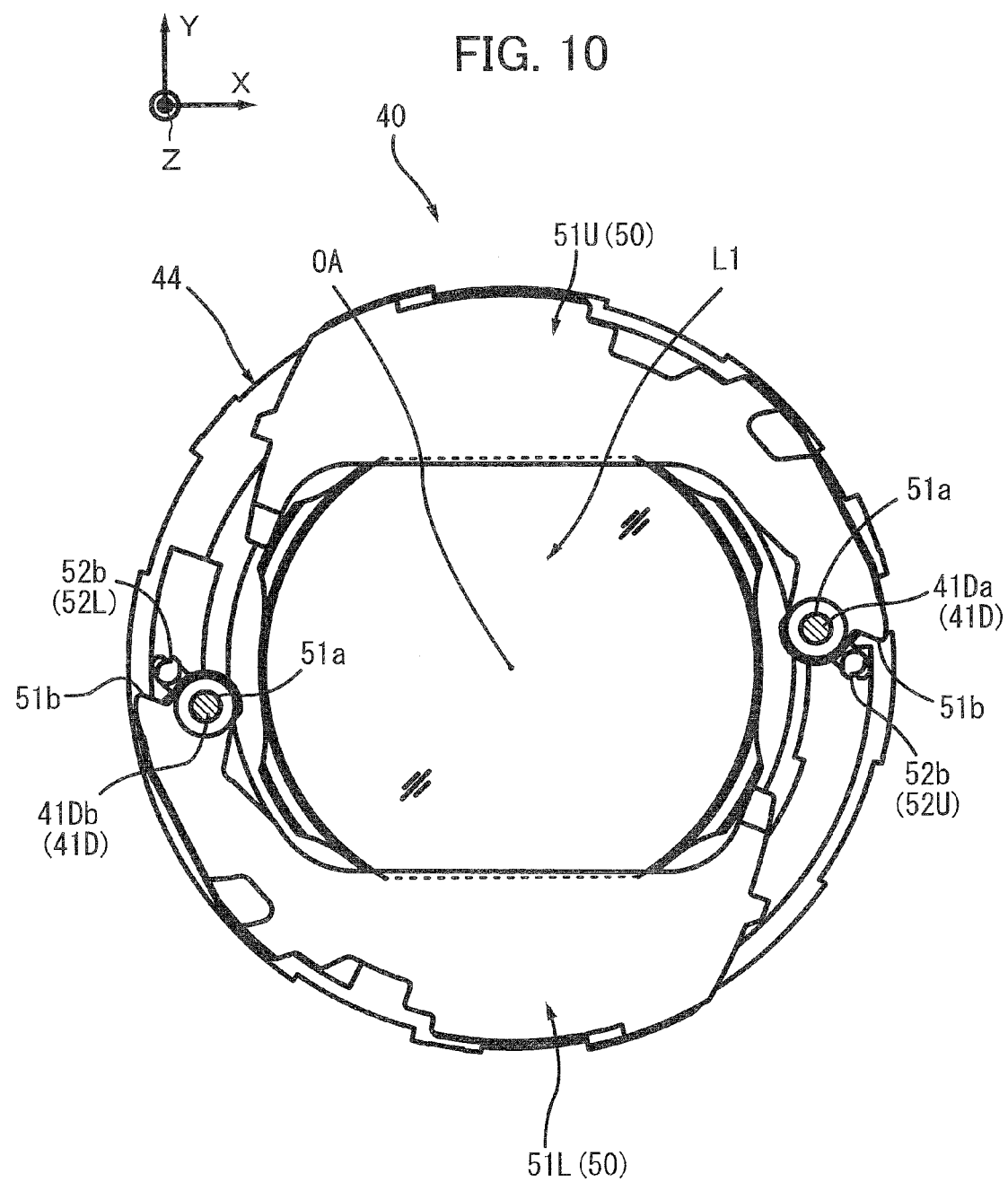
FIG. 10 is a sectional view of a state in which the barrier blades are opened, corresponding to arrows A-A in FIG. 3.
Figure 11:
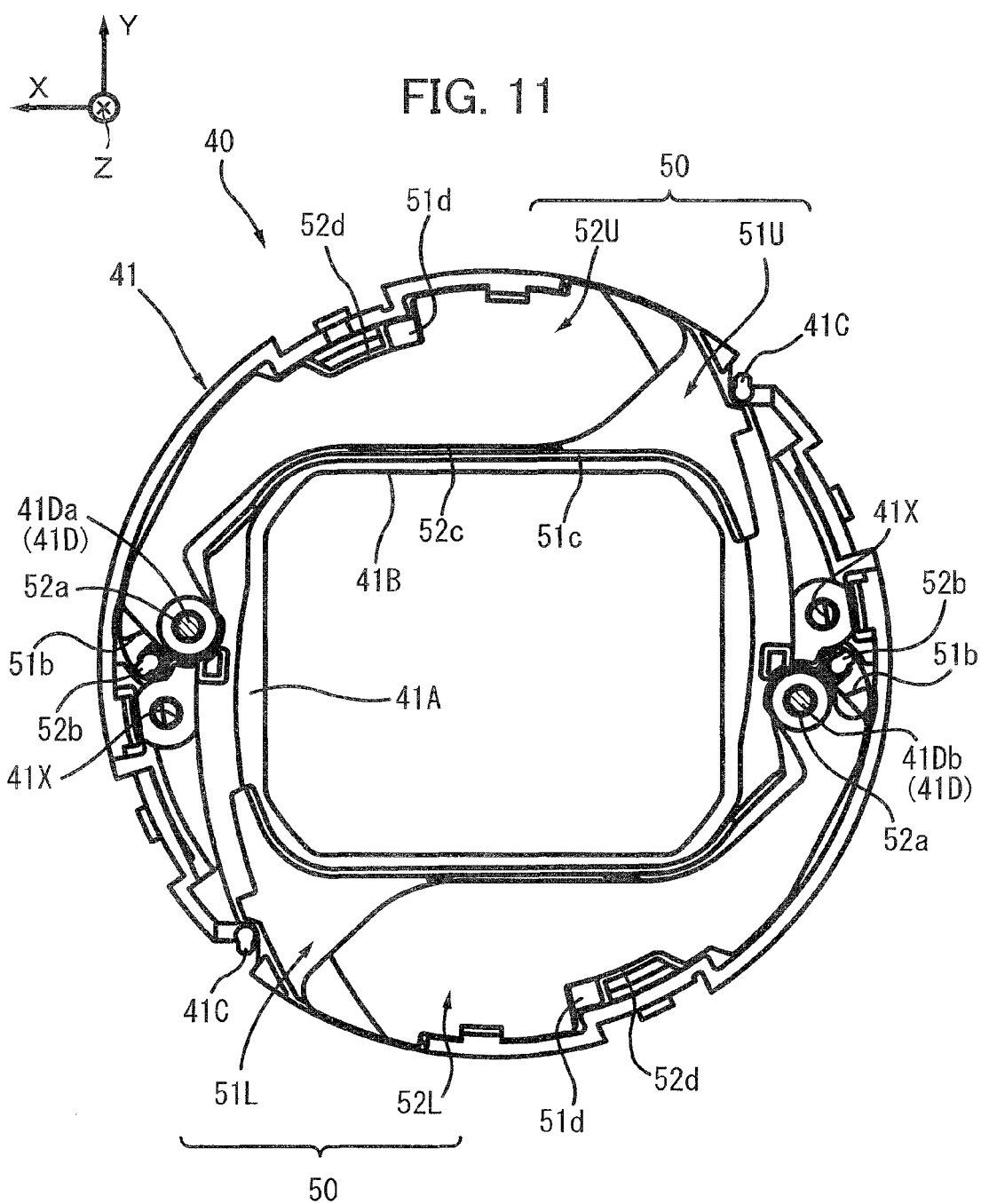
FIG. 11 is a sectional view of the state in which the barrier blades are opened, corresponding to arrows B-B in FIG. 3.
Figure 13A:
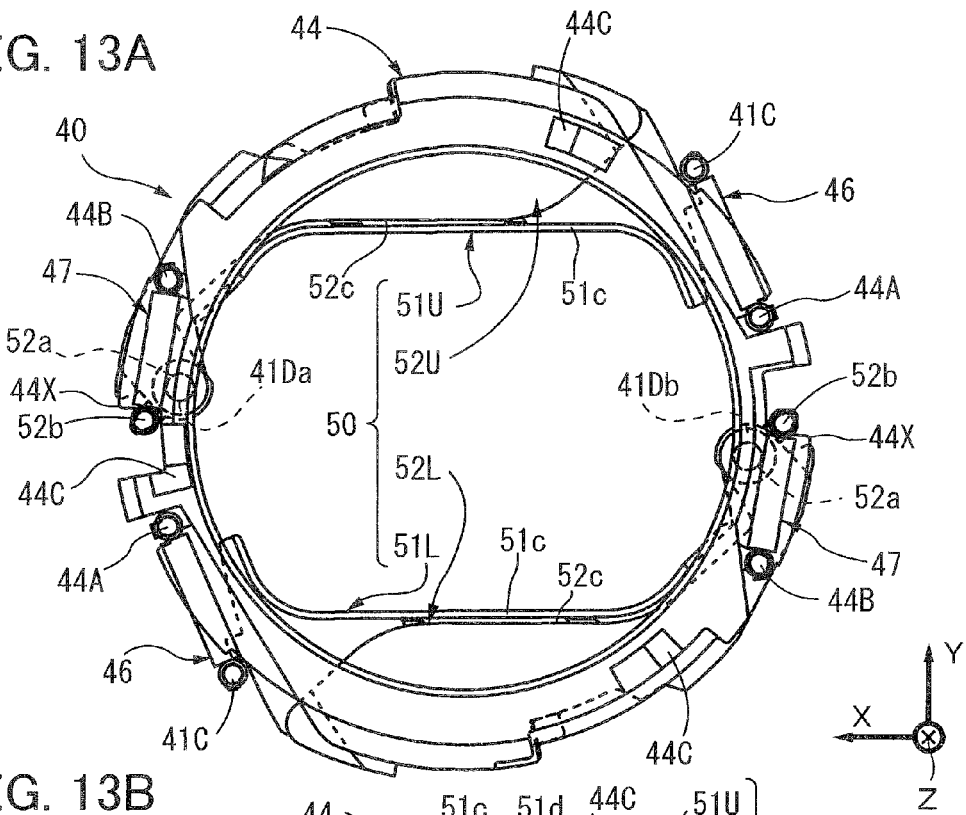
FIG. 13A is a diagram of a state in which the coupling plate is showing together with the barrier blades, corresponding to arrows C-C in FIG. 3, showing the opened state of the barrier blades.
Figure 13B:
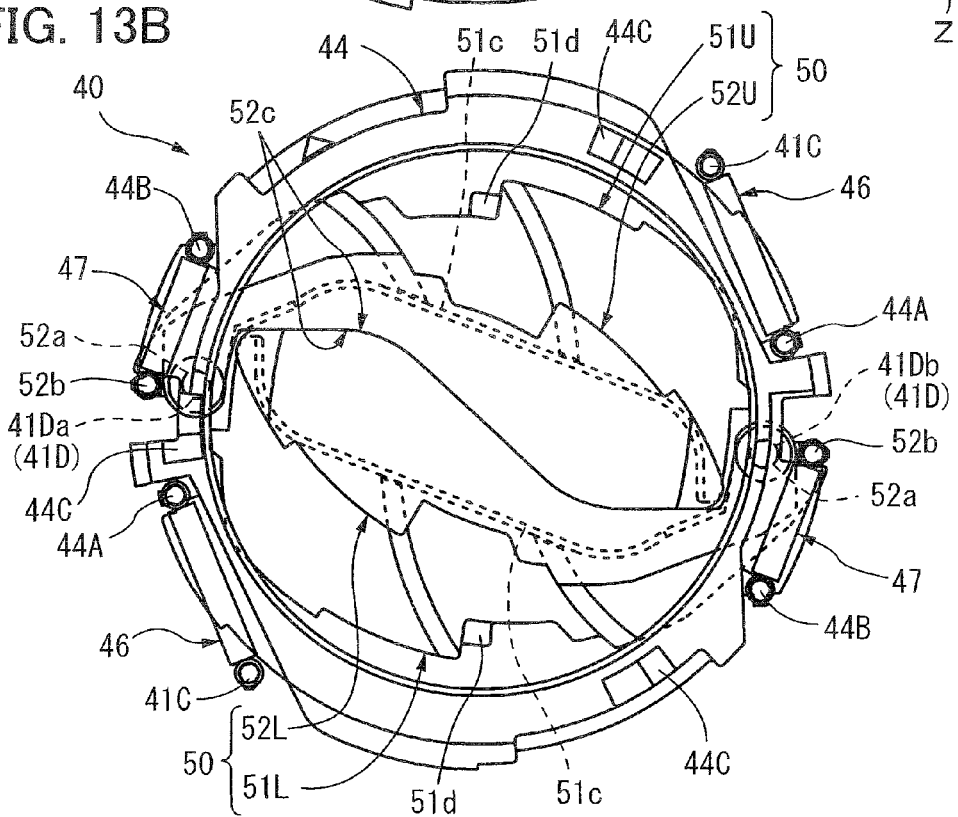
FIG. 13B is a diagram of a state in which the coupling plate is showing together with the barrier blades, corresponding to arrows C-C in FIG. 3, showing the closed state of the barrier blades.

FIG. 7 is an exploded diagram of a barrier frame 41 and the barrier blades 50. FIG. 8 is a perspective diagram of an outer blade 51 and each inner blade 52 viewed from the imaging plane side, and FIG. 9 is a diagram of the outer blade 51 and the inner blade 52 viewed from the object side. FIG. 10 is a sectional view of the state in which the barrier blades 50 are opened, corresponding to arrows A-A in FIG. 3. FIG. 11 is a sectional view of the state in which the barrier blades 50 are opened, corresponding to arrows B-B in FIG. 3. FIG. 12 is a diagram corresponding to FIG. 11 of the state in which the barrier blades 50 are closed. FIG. 13A is a diagram of a state in which the coupling plate 44 is showing together with the barrier blades 50, corresponding to arrows C-C in FIG. 3, showing the opened state of the barrier blades 50, and FIG. 13B shows the closed state of the barrier blades 50.

As illustrated in FIG. 3, which is an exploded perspective view, the barrier mechanism 40 is configured with the barrier frame 41 being mounted at the front face side of the barrier tube 15, and the barrier blades 50, a seat 42, a barrier press plate 43, and the coupling plate 44 being disposed in an overlapping state between the barrier tube 15 and the barrier frame 41. A trim ring 45 covers the front face side of the barrier frame 41.

Snap-fit portions 15D are formed to protrude from the front face side of the barrier tube 15. The barrier frame 41 is integrally mounted to the front face side of the barrier tube 15 by each snap-fit portion 15D engaging with an engaging portion 41E at the outer periphery of the barrier frame 41.

As mentioned above, the first lens chamber 16 is disposed at the inner periphery side of the barrier tube 15, and the cam tube 17 is disposed at the inner periphery side of the first lens chamber 16.

As also mentioned above, the barrier restrict surfaces 17E are formed at predetermined positions of the front face side of the cam tube 17.

As illustrated in FIG. 7, the barrier frame 41 is a cylinder that is provided with a front face plate 41A at the front face side thereof, and has a predetermined thickness in the optical axis OA direction. A barrel-shape aperture portion 41B is formed in the front face plate 41A to correspond with the front face shape of the first lens unit L1 (but slightly smaller). Anchoring portions 41C are provided protruding from the rear face side of the barrier frame 41. An end portion of a rotation urging spring 46 for urging the coupling plate 44 to rotate, which is described below, is anchored at each anchoring portion 41C. The anchoring portions 41C are disposed at two locations, at positions that are symmetrical about the optical axis OA.

The barrier blades 50 are constituted by an upper outer blade 51U, a lower outer blade 51L, the upper inner blade 52U and the lower inner blade 52L. The upper outer blade 51U and the lower outer blade 51L are formed in shapes that have point symmetry about the optical axis OA, and the upper inner blade 52U and the lower inner blade 52L are formed in shapes that have point symmetry about the optical axis OA. Accordingly, in the following descriptions, except where specifically required, the upper outer blade 51U and the lower outer blade 51L are described as the outer blades 51, and the upper inner blade 52U and the lower inner blade 52L are described as the inner blades 52. A blade support shaft 41Da that supports the upper outer blade 51U and the upper inner blade 52U and a blade support shaft 41Db that supports the lower outer blade 51L and the lower inner blade 52L are collectively described as blade support shafts 41D, except where specifically required.

The outer blades 51 are disposed adjacent to the rear face side of the front face plate 41A of the barrier frame 41, as illustrated in FIG. 7. As illustrated in FIG. 8 and FIG. 9, a hole 51a is provided at one circumferential direction end of each outer blade 51. The hole 51a fits round the blade support shaft 41D of the barrier frame 41. An operating protrusion 51b is formed at the outer periphery side of the hole 51a. An operated protrusion 51d, which is operated by the inner blade 52, is provided protruding from the rear face side of the outer blade 51 at a substantially central portion in the circumferential direction of the outer side edge of the outer blade 51.

The inner blades 52 are disposed adjacent to the rear face side of the outer blades 51, as illustrated in FIG. 7. As illustrated in FIG. 8 and FIG. 9, a hole 52a is provided at one circumferential direction end of each inner blade 52. The hole 52a fits round the blade support shaft 41D of the barrier frame 41. At the outer periphery side of the hole 52a, an anchoring and operation protrusion 52b is formed to protrude by predetermined amounts to front and rear. An end portion of a swing urging spring 47 that urges the inner blade 52 to swing is anchored at the anchoring and operation protrusion 52b.

As illustrated in FIG. 10 to FIG. 12, the upper outer blade 51U and the upper inner blade 52U are both swingably supported at the blade support shaft 41Da, which is disposed at the X plus side of the aperture portion 41B. Meanwhile, the lower outer blade 51L and the lower inner blade 52L are both swingably supported at the blade support shaft 41Db, which is disposed at the X minus side of the aperture portion 41B. Thus, the upper outer blade 51U and upper inner blade 52U swing about the blade support shaft 41Da and the lower outer blade 51L and lower inner blade 52L swing about the blade support shaft 41Db to open and close the aperture portion 41B.

As illustrated in FIG. 10 and FIG. 11, in the state in which the barrier blades 50 open up the aperture portion 41B of the barrier frame 41 (the opened state), the upper outer blade 51U and the upper inner blade 52U overlap and are accommodated between an upper side (Y plus side) aperture edge of the aperture portion 41B and the outer periphery face of the barrier frame 41. Meanwhile, the lower outer blade 51L and the lower inner blade 52L overlap and are accommodated between a lower side (−Y side) aperture edge of the aperture portion 41B and the outer periphery face of the barrier frame 41. In the present embodiment, the opened state illustrated in FIG. 10, FIG. 11 and FIG. 13A in which the barrier blades 50 open up the aperture portion 41B in this manner is a basic state. From this opened state, the barrier blades 50 are put into the closed state illustrated in FIG. 12 and FIG. 13B by the coupling plate 44 operating.

In the state in which the barrier blades 50 close off the aperture portion 41B of the barrier frame 41 (the closed state), as illustrated in FIG. 11, substantially the upper half of the aperture portion 418 of the barrier frame 41 is covered by the upper outer blade 51U and the upper inner blade 52U and substantially the lower half of the aperture portion 41B is covered by the lower outer blade 51L and the lower inner blade 52L. That is, inner edges 52c of the upper inner blade 52U and the lower inner blade 52L match up and close the middle of the aperture portion 418, and gaps between outer edges of the upper inner blade 52U and lower inner blade 52L and the edges of the aperture portion 41B are closed by the upper outer blade 51U and the lower outer blade 51L. Thus, the whole of the aperture portion 41B is covered.

In the opened state, inner edges 51c at the inner sides (the optical axis OA sides) of the outer blades 51 are specified so as to be disposed slightly to the outer side of the edges of the aperture portion 41B, in parallel with and at the inner side (the optical axis side) relative to the cut-off end faces of the first lens unit L1.

Figure 14:
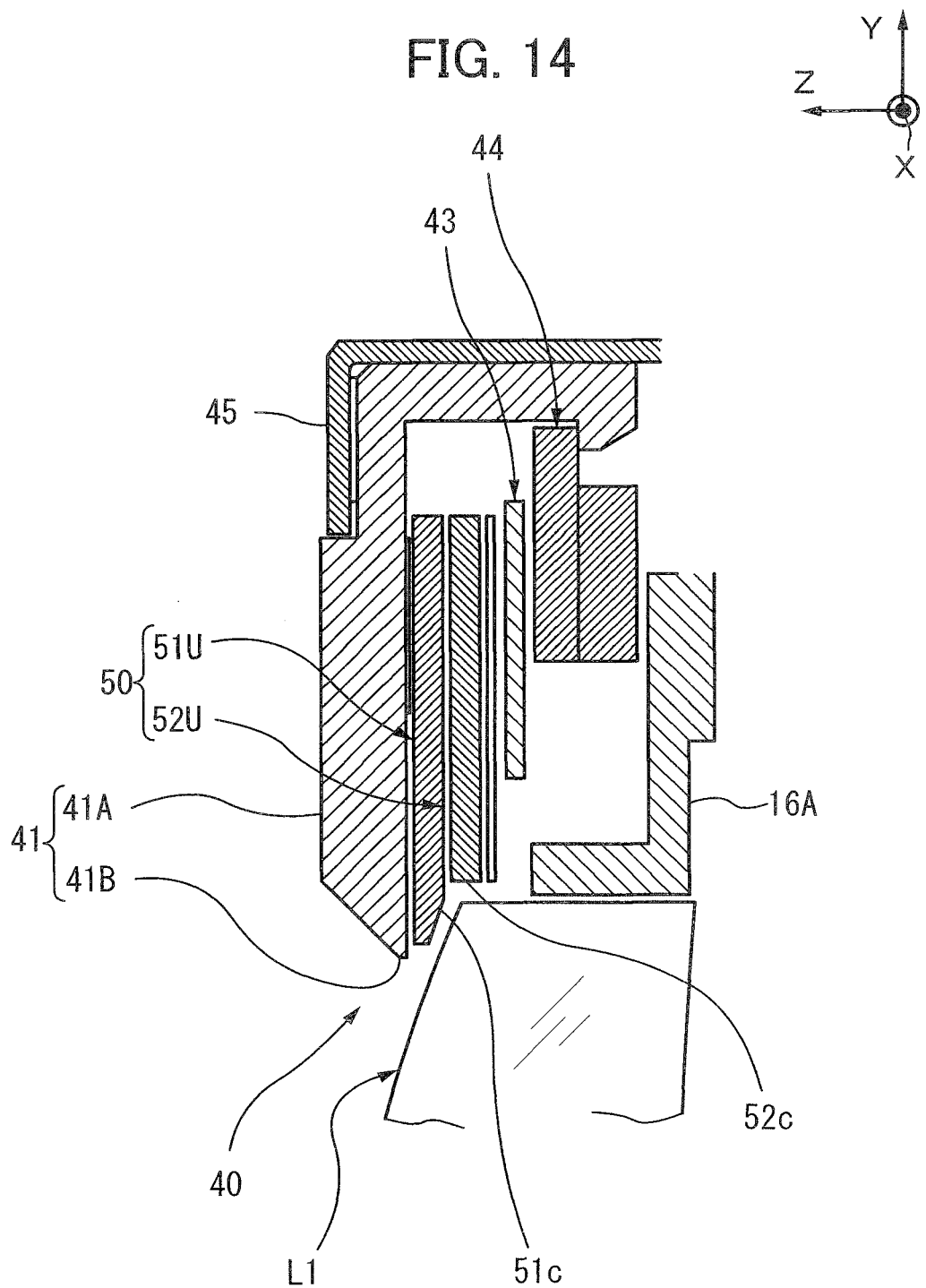
FIG. 14 is a magnified diagram of portion D of FIG. 1.

As illustrated in FIG. 14, which is a magnified diagram of portion D of FIG. 1, the end face of the inner edge 51c of each outer blade 51 is formed with an incline at a predetermined angle in a direction that widens to the rear face side (a direction such that the rear face side is further away from the optical axis OA). The inclination angle of the end face of the inner edge 51c corresponds with a curved surface at the front face of the first lens unit L1. Therefore, during the shooting standby illustrated in FIG. 1, the front face of the first lens unit L1 may be brought extremely close to the outer blades 51. Consequently, the first lens unit L1 may be maximally projected to the front face side (the object side) and a wider angle of view may be provided. This mechanism is not necessary if the end edges of the front face of the first lens unit L1 are protruded beyond the outer blades 51, however, because the outer blades 51 would have to be disposed further to the outer side (the outward side as viewed from the optical axis), the external diameter of the lens barrel 10 would be larger. The cut-off end faces of the first lens unit L1 are portions that would not be optically utilized anyway. Therefore, there is no effect on optical performance if the inner edges 51c of the outer blades 51 are caused to slightly overlap with the edges of the front face of the first lens unit L1.

The inner edge 52c at the inner side (the optical axis OA side) of each inner blade 52 is disposed to the outer side relative to the upper and lower cut-off edges of the front face portion of the first lens unit L1 when in shooting standby, as illustrated in FIG. 1, and is specified such that the front face of the first lens unit L1 may be brought close to the outer blades 51 without interfering with the inner blades 52.

An operation recess portion 52d that operates the operated protrusion 51d of each outer blade 51 is formed at a substantially central portion in the circumferential direction of the outer side edge of each inner blade 52.

The barrier press plate 43 is a thin plate and is formed in a shape that corresponds with the barrier frame 41. A screw hole is formed at two locations of the barrier press plate 43, substantially on the X axis at positions that are symmetrical about the optical axis OA. A screw 43A is inserted into each hole as illustrated in FIG. 3, and each screw 43A fastens into a screw hole 41X provided in the barrier frame 41 (see FIG. 7, FIG. 11 and FIG. 12).

The coupling plate 44 is a substantially circular ring that is accommodated inside the barrier frame 41. As illustrated in FIG. 13A and FIG. 13B, the coupling plate 44 is provided with anchoring bosses 44A and fixed bosses 44B. An end portion of each rotation urging spring 46 is anchored at the anchoring boss 44A, and an end portion of each swing urging spring 47, which urges a barrier blade 50 (the inner blade 52) to swing, is fixed at the fixed boss 44B. The anchoring bosses 44A and the fixed bosses 44B are each disposed at two locations at positions that are symmetrical about the optical axis OA.

The operated/restrict protrusion 440 is provided protruding from three locations at predetermined positions of the rear face side of the coupling plate 44, at equal intervals in the circumferential direction (120°). Each operated/restrict protrusion 44C is pushed to rotate by the barrier restrict surface 17E of the cam tube 17 when the lens barrel 10 is in the collapsed state, and has the function of causing the coupling plate 44 to rotate in the clockwise direction of FIG. 11.

As illustrated in FIG. 4 and FIG. 5, the operated/restrict protrusion 44C is provided with an operated protrusion portion 44Ca and the lens restrict protrusion portion 44Cc.

Each operated protrusion portion 44Ca is a square rod and protrudes to a predetermined height from the rear face side of the coupling plate 44. A face at the anticlockwise direction forward side of the coupling plate 44 as viewed from the rear face side serves as an operated surface 44Cb. In the collapsed state, the operated protrusion portion 44Ca fits into the fitting hole 16D of the first lens chamber 16 and protrudes to the rear face side thereof, and the operated surface 44Cb is pushed and operated by the barrier restrict surface 17E of the cam tube 17.

The lens restrict protrusion portion 44Cc is formed to a predetermined height, lower than the operated protrusion portion 44Ca, from a base portion of the operated protrusion portion 44Ca, in a predetermined range to the clockwise direction forward side of the coupling plate 44 as viewed from the rear face side. A surface of the lens restrict protrusion portion 44Cc that is orthogonal to the optical axis OA and faces to the rear face side serves as the restrict surface 44Cd. In the collapsed state (when the barrier blades 50 are in the closed state), the lens restrict protrusion portion 44Cc is disposed to oppose the movement restrict portion 16Aa of the support portion 16A of the first lens chamber 16.

The lens restrict protrusion portion 44Cc cooperates with the movement restrict portion 16Aa of the first lens chamber 16 and prevents the first lens unit L1 abutting against the barrier blades 50 if there is a problem with opening of the barrier blades 50. This operation is described in more detail below.

One end portion of each rotation urging spring 46 is anchored at the anchoring portion 41C of the barrier frame 41 and the other end portion is anchored at the anchoring boss 44A of the coupling plate 44. The rotation urging springs 46 are disposed at two locations, at positions that are symmetrical about the optical axis OA. The rotation urging springs 46 urge the barrier frame 41 to rotate in the anticlockwise direction of FIG. 13A and FIG. 13B with respect to the barrier frame 41, by elastic restoring force.

One end portion of each swing urging spring 47 is fixed at the fixed boss 44B of the coupling plate 44 and the other end portion is anchored at the anchoring and operation protrusion 52b of the inner blade 52. The swing urging springs 47 are provided in respective correspondence with the two inner blades 52 (the upper inner blade 52U and the lower inner blade 52L). That, is, the swing urging springs 47 are disposed at two locations, at positions that are symmetrical about the optical axis OA. The swing urging springs 47 urge the inner blades 52 to swing in directions of closing, by elastic restoring force.

At each inner blade 52 that is urged to swing in the direction of closing by the swing urging spring 47, an end face 44x of the coupling plate 44 pushes up the anchoring and operation protrusion 52b of the inner blade 52 due to the coupling plate 44 rotating in the anticlockwise direction, and the inner blade 52 rotates in the anticlockwise direction. Because of this rotation, the operation recess portion 52d pushes the operated protrusion 51d of the outer blade 51 and operates the outer blade 51 to swing toward the opened state.

The inner blade 52 pushes the operated surface 51b of the outer blade 51 with the operation recess portion 52d and operates the outer blade 51 to swing toward the opened state.

Thus, the outer blades 51 and the inner blades 52 overlap, and go into the opened state in which they are accommodated between the aperture edges of the aperture portion 41B and the outer periphery face of the barrier frame 41.

In the barrier mechanism 40 that is configured as described above, the coupling plate 44 is disposed by the urging force of the rotation urging springs 46 at one end of the range in which the coupling plate 44 is rotatable (hereinafter referred to as the free position of the coupling plate 44). At the free position, the outer blades 51 and the inner blades 52 overlap and are accommodated between the aperture edges of the aperture portion 41B and the outer periphery face of the barrier frame 41, and are in the opened state in which the aperture portion 41B is opened.

When the coupling plate 44 is operated to rotate through a predetermined angle in opposition to the urging force of the rotation urging springs 46, by operations as described below, the barrier blades 50 go into the closed state.

From the collapsed state of the lens barrel 10, the coupling plate 44 is operated to rotate through the predetermined angle in opposition to the urging force of the rotation urging springs 46 by the cam tube 17. That is, each operated/restrict protrusion 44C of the coupling plate 44 interferes with the barrier restrict surface 17E of the cam tube 17, the operated/restrict protrusion 44C is pushed and operated by the barrier restrict surface 17E, and as a result the coupling plate 44 rotates through the predetermined angle. Accordingly, by operations as described below, the barrier blades 50 go into the closed state.

That is, from the opened state, when the coupling plate 44 is operated to rotate clockwise in FIG. 13A (in the direction opposite to arrow F in FIG. 4) in opposition to the urging force of the rotation urging springs 46, each fixed boss 44B moves with respect to the blade support shaft 41D that supports the outer blade 51 and the inner blade 52. Thus, the inner blade 52 is operated to swing in the direction of closing, via the swing urging spring 47 that links between the fixed boss 44B and the anchoring and operation protrusion 52b of the inner blade 52. When the inner blade 52 swings in the direction of closing, the anchoring and operation protrusion 52b pushes the operating protrusion 51b of the outer blade 51 and operates the outer blade 51 to swing in the direction of closing. Thus, as illustrated in FIG. 13B, the outer blades 51 and the inner blades 52 go into the closed state in which the aperture portion 41B is closed.

When the lens barrel 10 extends from the collapsed state and goes into the shooting standby state, pushing operation of the operated/restrict protrusions 44C of the coupling plate 44 by the barrier restrict surfaces 17E of the cam tube 17 is released. Therefore, the coupling plate 44 rotates due to the elastic restoring force of the rotation urging springs 46 and returns to the free position. Consequently, the outer blades 51 and the inner blades 52 overlap as mentioned above and go into the opened state in which the aperture portion 41B is opened.

As described above, at the barrier mechanism 40, when the lens barrel 10 is in the shooting standby state illustrated in FIG. 1, the barrier blades 50 are open and the aperture portion 41B is in the opened state, and when the lens barrel 10 is in the collapsed state illustrated in FIG. 2, the aperture portion 41B is in the closed state that is closed off by the barrier blades 50.

In the shooting standby state illustrated in FIG. 1 in which the barrier blades 50 of the barrier mechanism 40 are in the opened state, as mentioned above, the upper outer blade 51U and the upper inner blade 52U of the barrier blades 50 overlap and are accommodated between the aperture edge at the upper side (the Y plus side) of the aperture portion 41B, which has the barrel-shape corresponding with the front face shape of the first lens unit L1, and the outer periphery face of the barrier frame 41. Meanwhile, the lower outer blade 51L and the lower inner blade 52L overlap and are accommodated between the aperture edge at the lower side (the Y minus side) of the aperture portion 41B and the outer periphery face of the barrier frame 41. Thus, the barrier blades 50 may be reasonably accommodated without the external diameter of the lens barrel 10 increasing.

The end surface of the inner edge 51c of each outer blade 51 of the barrier blades 50 is an inclined surface that widens to the rear face side with an angle that corresponds to the curved surface of the front face of the first lens unit L1. Therefore, the front face of the first lens unit L1 may be brought extremely close to the outer blades 51, and hence the first lens unit L1 may be maximally projected to the front face side (the object side) and a wider angle of view may be provided.

When the operation to push the operated/restrict protrusions 44C of the coupling plate 44 is released, the coupling plate 44 rotates due to the elastic restoring force of the rotation urging springs 46 and returns to the free position. When the coupling plate 44 is returning to the free position, the operating protrusion 51b of each inner blade 52 is pushed up by the rotation force of the end face 44x of the coupling plate 44, and the inner blade 52 swings in the direction of opening. When the inner blade 52 swings in the direction of opening, the operation recess portion 52d of the inner blade 52 abuts against the operated protrusion 51d of the outer blade 51, and operates the outer blade 51 to swing in the direction of opening. Consequently, the outer blades 51 and the inner blades 52 overlap and go into the opened state in which the aperture portion 415 is opened up.

As mentioned above, the barrier blades 50 of the barrier mechanism 40 are in the opened state in the shooting standby state illustrated in FIG. 1 and are in the closed state in the collapsed state illustrated in FIG. 2.

An operation to rotate the coupling plate 44 to put the barrier blades 50 into the closed state in the collapsed state is implemented by the barrier restrict surfaces 17E of the cam tube 17.

When the lens barrel 10 is extending and contracting, as mentioned above, although the cam tube 17 translates while rotating, the barrier tube 15 that is provided with the barrier mechanism 40 translates without rotating. That is, when the lens barrel 10 is extending or contracting, the cam tube 17 relatively rotates with respect to the barrier mechanism 40.

Because of the relative rotation of the cam tube 17 with respect to the barrier mechanism 40, the barrier restrict surfaces 17E of the cam tube 17 operate to rotate the operated/restrict protrusions 44C such that the barrier blades 50 go into the closed state. That is, when switching from the shooting standby state to the collapsed state, the cam tube 17 rotates clockwise in FIG. 13A and FIG. 13B with respect to the coupling plate 44 (the direction opposite to arrow E in FIG. 4) and the barrier restrict surfaces 17E of the cam tube 17 operate the operated/restrict protrusions 44C of the coupling plate 44 to rotate clockwise, and in the collapsed state the barrier blades 50 are in the closed state as illustrated in FIG. 13B.

Figure 6C:
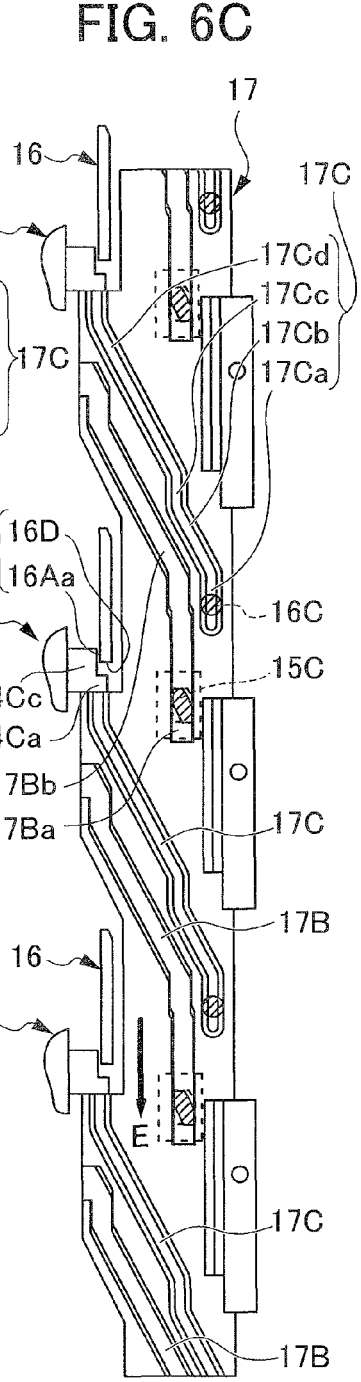
FIG. 6C is a diagram describing operation of the barrier tube helicoid groove and lens chamber driving cam groove of the cam tube, and movement restriction of the first lens chamber by the coupling plate, showing a collapsed state.

In this state, as illustrated in FIG. 6C, each operated protrusion portion 440a of the operated/restrict protrusion 44C of the coupling plate 44 fits into the fitting hole 16D of the first lens chamber 16 and protrudes to the rear face side thereof. Meanwhile, the lens restrict protrusion portion 44Cc of the operated/restrict protrusion 44C opposes the movement restrict portion 16Aa of the first lens chamber 16.

On the other hand, when switching from the collapsed state to the shooting standby state, the cam tube 17 rotates anticlockwise from the collapsed state illustrated in FIG. 13B with respect to the coupling plate 44 (in the direction of arrow E in FIG. 4), and the operation of the operated/restrict protrusions 440 of the coupling plate 44 being pushed by the barrier restrict surfaces 17S is released. Therefore, the coupling plate 44 rotates due to the elastic restoring force of the rotation urging springs 46 and returns to the free position, and in the shooting standby state the barrier blades 50 are in the opened state as illustrated in FIG. 13A.

In this state, as illustrated in FIG. 6A, the lens restrict protrusion portion 44Cc of each operated/restrict protrusion 440 of the coupling plate 44 is disposed to oppose the fitting hole 16D of the first lens chamber 16 by the rotation of the coupling plate 44, and the whole of the operated/restrict protrusion 44C is fitted into the fitting hole 16D.

Now, if the coupling plate 44 does not return to the free state even though an operation to switch from the collapsed state to the shooting standby state is performed, the lens restrict protrusion portions 440c of the operated/restrict protrusions 44C of the coupling plate 44 and the movement restrict portions 16Aa of the first lens chamber 16 operate as described below and restrict an advance of the first lens chamber 16 with respect to the barrier tube 15.

That is, if the coupling plate 44 does not return to the free state (the coupling plate 44 does not rotate) even though the operation to switch from the collapsed state to the shooting standby state is performed (the operation to rotate the cam tube 17 in the direction of arrow E in FIG. 4), the relative positions in the rotation direction of the first lens chamber 16 and the coupling plate 44 do not change. In this state, as illustrated in FIG. 65, each movement restrict portion 16Aa of the first lens chamber 16 that is advancing with respect to the barrier tube 15 abuts against the lens restrict protrusion portion 44Cc (the restrict surface 44Cd) of the operated/restrict protrusion 44C. Therefore, the advance of the first lens chamber 16 with respect to the barrier tube 15 is restricted.

That is, the fact that the coupling plate 44 does not return to the free state, even though the operation of switching from the collapsed state to the shooting standby state is performed and the cam tube 17 rotates anticlockwise, means that the barrier blades 50 are not going from the closed state to the opened state for some reason (for example, the barrier blades 50 being pressed or the like). Using FIG. 13B to describe this, when the end faces 44x are moving in the anticlockwise direction (a closed-to-opened operation), if the inner blades 52 are pressed by an external force, the rotation of the end faces 44x is obstructed because the inner blades 52 are fixed thereto, and the end faces 44x may not rotate. If the outer blades 51 are pressed, because the outer blades 51 and the inner blades 52 overlap, the inner blades 52 are also pressed. Thus, the inner blades 52 are fixed and rotation of the end faces 44x is obstructed. If the first lens chamber 16 were to advance with respect to the barrier tube 15 in this state, the front face of the first lens unit L1 retained by the first lens chamber 16 might come into contact with the barrier blades 50 of the barrier mechanism 40 and be damaged. In the present mechanism, the lens restrict protrusion portions 44Cc of the operated/restrict protrusions 44C forcibly block an advance of the first lens chamber 16 with respect to the barrier tube 15, and this problem is prevented.

If the coupling plate 44 does return to the free state, the coupling plate 44 relatively rotates in the direction of arrow F in FIG. 4 with respect to the first lens chamber 16, and the lens restrict protrusion portions 44Cc match up with the fitting holes 16D of the first lens chamber 16. Hence, the lens restrict protrusion portions 44Cc fit into the fitting holes 16D of the first lens chamber 16 and an advance of the first lens chamber 16 with respect to the barrier tube 15 is enabled, and it is possible to switch from the collapsed state to the shooting standby state.

According to the present embodiment, the following effects are provided.

(1) In the lens barrel 10, the front face of the first lens unit L1, which is disposed at the rear face side of the barrier blades 50 in the collapsed state, protrudes to the front face side beyond the inner blades 52U and 52L of the barrier blades 50, which are in the opened state, in the shooting standby state. If the coupling plate 44 which operate at the same time as the barrier blades 50 and do not rotate to the free position even though the operation for switching from the collapsed state to the shooting standby state is performed, the movement restrict portions 16Aa of the first lens chamber 16 that is advancing with respect to the barrier tube 15 and the lens restrict protrusion portions 44Cc (restrict surfaces 44Cd) of the operated/restrict protrusions 44C abut, and the advance of the first lens chamber 16 with respect to the barrier tube 15 is restricted.

Thus, if the barrier blades 50 do not go into the opened state for a reason such as the barrier blades 50 being pressed or the like, a relative advance of the first lens unit L1 with respect to the barrier blades 50 is obstructed, and the front face of the first lens unit L1 may be prevented from touching against the barrier blades 50. Therefore, problems of damage to the front face of the first lens unit L1 and/or damage to the barrier blades 50 that would be caused by the front face of the first lens unit L1 abutting against the barrier blades 50 may be prevented.

(2) Each operated/restrict protrusion 44C of the coupling plate 44 of the barrier mechanism 40 is configured to be provided, at a single protrusion portion, with both the operated surface 44Cb that is operated by the barrier restrict surface 17E of the cam tube 17 and the restrict surface 44Cd that abuts against and restricts movement of the movement restrict portion 16Aa of the first lens chamber 16. Therefore, a simpler and more rational structure than a structure that is provided with the operated surface 44Cb and the restrict surface 44Cd separately may be formed, and a reduction in size is possible.

(3) The front face portion of the first lens unit L1 that is disposed furthest to the front face side of the lens barrel 10 corresponds to the imaging surface with a landscape orientation with a predetermined aspect of the imaging device 3A of the sensor unit 3, and is formed in a barrel-shape that is cut down to a predetermined spacing in the vertical direction. The barrier blades 50 are configured so as to be accommodated in the cut-off regions above and below the first lens unit L1. Therefore, the barrier blades 50 may be rationally accommodated without the external diameter of the lens barrel 10 increasing, and the lens barrel 10 may be structured with a small size at low cost.

(4) The inner edges 51c of the outer blades 51 that constitute the barrier blades 50 are formed to be inclined in directions of widening to the rear face side (directions such that the rear face sides thereof are further away from the optical axis OA) to correspond with the curved surface of the front face of the first lens unit L1. Therefore, the first lens unit L1 may be disposed further to the front face side and a wider angle of view may be provided.

Second Embodiment

Figure 15:
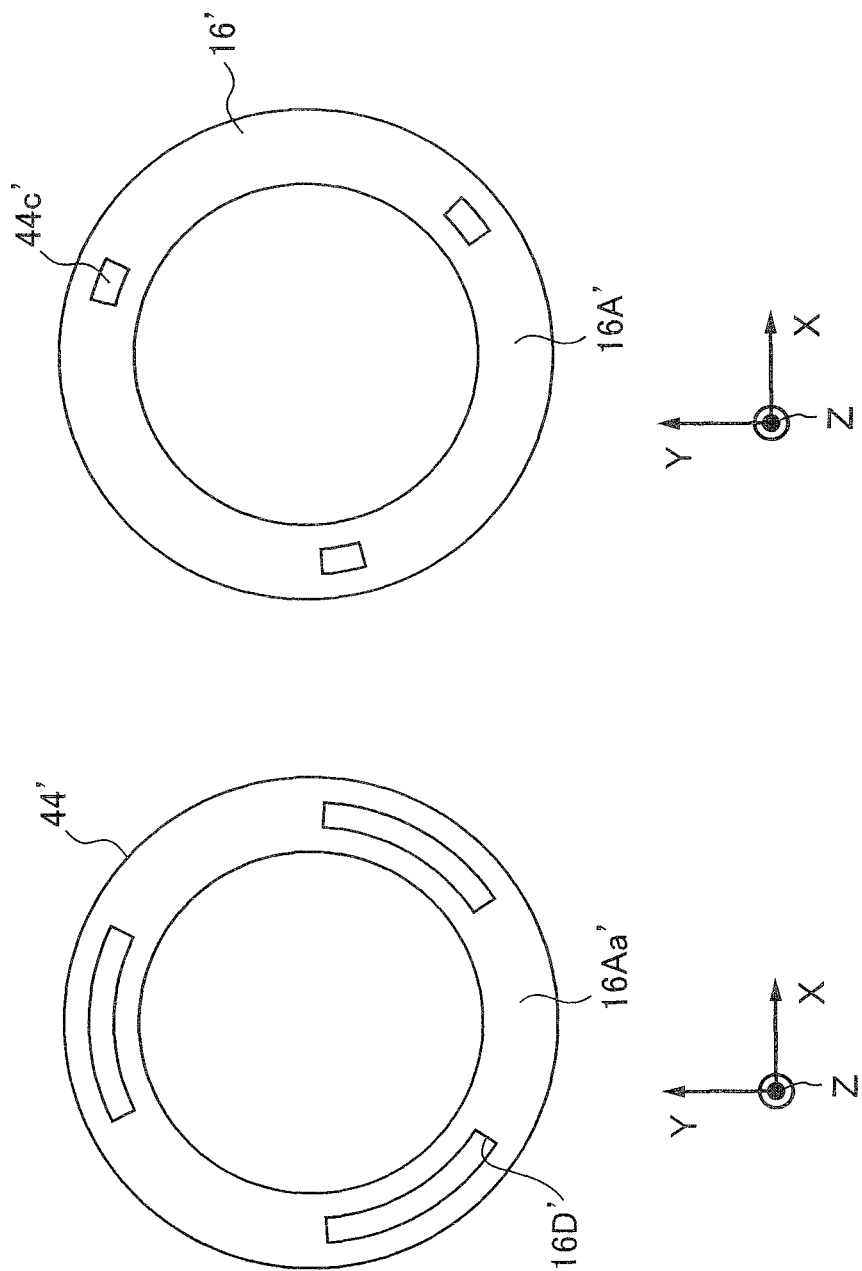
FIG. 15 is a front view of a first lens chamber and a coupling plate of a second embodiment of the present invention.
Figure 16:
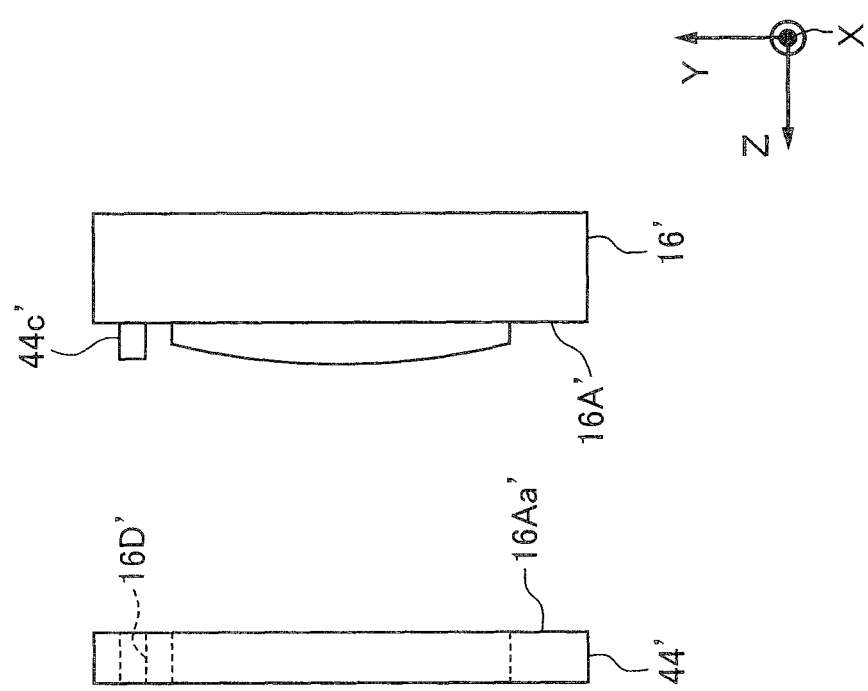
FIG. 16 is a view in which the first lens chamber and the coupling plate are seen from the X plus direction.

In the above-described first embodiment, a mode is described in which the fitting holes 16D are provided at the first lens chamber 16, and the operated/restrict protrusions 44C provided at the coupling plate 44 are inserted into the fitting holes 16D. However, the present invention is not to be limited thus. FIG. 15 and FIG. 16 are diagrams illustrating the second embodiment of the present invention. FIG. 15 is a front view of the first lens chamber 16 and the coupling plate 44 of the second embodiment (a view seen from the Z plus direction). FIG. 16 is a view in which the first lens chamber 16 and the coupling plate 44 are seen from the X plus direction. In the description below, portions that are the same as in the first embodiment are not described, and are described with the same reference numerals.

As illustrated, in the present embodiment, operated/restrict protrusions 44C' are formed at support portions 16A' of a first lens chamber 16', at three locations that are equally spaced in the circumferential direction (at 120° intervals).

Meanwhile, fitting holes 160' are formed at a coupling plate 44'. The fitting holes 160' are formed at three locations at equal spacings in the circumferential direction (at 120° intervals), and are long holes with predetermined angular ranges in the circumferential direction.

A portion of the coupling plate 44' that opposes each fitting hole 160' of the support portion 16A' of the first lens chamber 16' serves as a movement restrict portion 16Aa' that is a flat surface orthogonal to the optical axis OA.

In the second embodiment too, similarly to the first embodiment, in the lens barrel 10, the front face of the first lens unit L1, which is disposed at the rear face side of the barrier blades 50 in the collapsed state, protrudes to the front face side beyond the inner blades 52U and 52L of the barrier blades 50, which are in the opened state, in the shooting standby state. If the barrier blades 50 and the coupling plate 44' do not rotate to the free position even though the operation for switching from the collapsed state to the shooting standby state is performed, the movement restrict portions 16Aa' and the operated/restrict protrusions 44C' abut, and an advance of the first lens chamber 16 with respect to the barrier tube 15 is restricted.

Therefore, if the barrier blades 50 do not go into the opened state for a reason such as the barrier blades 50 being pressed or the like, a relative advance of the first lens unit L1 with respect to the barrier blades 50 may be obstructed and the front face of the first lens unit L1 may be prevented from touching against the barrier blades 50. Thus, problems of damage to the front face of the first lens unit L1 and/or damage to the barrier blades 50 that are caused by the front face of the first lens unit L1 abutting against the barrier blades 50 may be prevented.

Variant Examples

The embodiments described above are not to be limiting. Numerous alterations and modifications as illustrated below are possible and are within the technical scope of the present invention.

(1) In the present embodiments, the front face of the first lens unit L1 that is disposed furthest to the front face side of the lens barrel 10 is disposed, in the shooting standby state, at the front face side relative to the inner blades 52 constituting the barrier blades 50 and at the rear face side relative to the outer blades 51. However, this state is not to be limited to times of shooting standby; a lens barrel that is specified with some state in which the first lens unit L1 protrudes furthest to the front is applicable. A mechanism in which the front face of the first lens unit L1 protrudes to the front face side relative to the outer blades 51 is also possible.

(2) In the present embodiments, the front face of the first lens unit L1 that is disposed furthest to the front face side of the lens barrel 10 is disposed, in the shooting standby state, at the front face side relative to the inner blades 52 constituting the barrier blades 50 and at the rear face side relative to the outer blades 51. However, this state is not to be limited to times of shooting standby; any specification of a state in which the first lens unit L1 protrudes furthest to the front is sufficient. A mechanism in which the front face of the first lens unit L1 protrudes to the front face side relative to the outer blades 51 is also possible.

(3) Collapse and zoom mechanisms are not to be limited to the structures described in the above embodiments and may be suitably modified.

Figure 17:
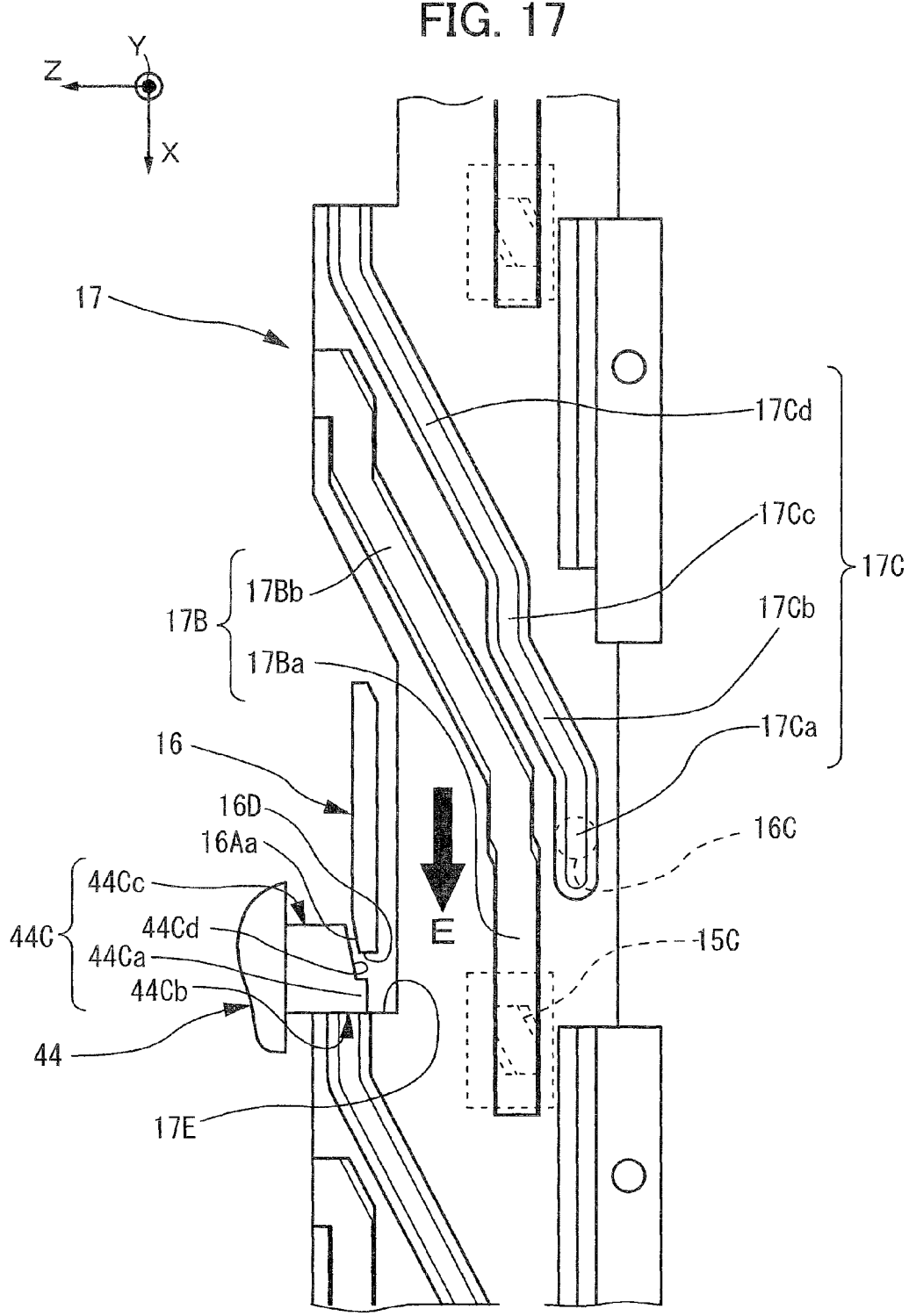
FIG. 17 is a diagram corresponding to FIG. 5, illustrating a variant example of a movement restrict portion and a restrict surface.

(4) In the embodiments described above, the movement restrict portions 16Aa of the first lens chamber 16 and the restrict surfaces 44Cd of the operated/restrict protrusions 44C of the coupling plate 44 which restrict movement of the first lens chamber 16 when the barrier blades 50 unopened are both flat surfaces orthogonal to the optical axis OA. However, it is not necessarily required that these be flat surfaces orthogonal to the optical axis OA. As illustrated in FIG. 17, which corresponds to FIG. 5, they may be flat surfaces that are inclined at predetermined angles with respect to the optical axis OA. Moreover, provided the shapes thereof match up, they may be curved surfaces or irregular surfaces or the like. The structural elements in FIG. 17 are assigned the same reference numerals as in FIG. 5.

(5) The embodiments described above are an example in which the invention of the present application is applied to a digital still camera. An optical instrument of the invention of the present application is not to be limited thus, and may be a "silver salt" still camera that uses film, a video camera, a portable telephone with an imaging function, a telescope or the like.

The embodiments and variant examples may be suitably combined but detailed descriptions are not given here. The present invention is not to be limited by the embodiments described above.

What is claimed is:

1. A lens barrel comprising:
    barrier blades that open and close in a directional orthogonal to an optical axis of an imaging optical system;
    an optical system retention frame that includes a first surface provided in a direction orthogonal to the optical axis, the optical system retention frame retaining the optical system and being relatively movable with respect to the barrier blades in a direction along the optical axis; and
    a coupling plate that includes a second surface that is relatively movable with respect to the first surface, the coupling plate causing the barrier blades to open and close by the coupling plate rotating about the optical axis;
    wherein, in a state in which the barrier blades are opened, the first surface is capable of moving in the optical axis direction without abutting against the second surface and, in a state in which the barrier blades are closed, the first surface abuts against the second surface and movement of the first surface in the optical axis direction is restricted.

2. The lens barrel according to claim 1, wherein the second surface is provided in parallel with the first surface.

3. The lens barrel according to claim 2, wherein the first surface and the second surface are provided in a direction substantially orthogonal to the optical axis.

4. The lens barrel according to claim 1, wherein, in the state in which the barrier blades are opened, the first surface is movable from a position at the image side relative to the second surface to a position at the object side relative to the second surface.

5. The lens barrel according to claim 1, wherein, in an shooting state, the optical system of the optical system retention frame is movable to a position at the object side relative to the barrier blades.

6. The lens barrel according to claim 1, wherein the second surface is provided at a plurality of locations separated by a spacing at the coupling plate.

7. The lens barrel according to claim 1, further comprising:
    a barrier tube that regulates positions in the optical axis direction of the barrier blades and the coupling plate; and
    a cam tube including a first cam groove that guides the barrier tube and a second cam groove that guides the optical system retention frame.

8. The lens barrel according to claim 7, wherein an amount of movement of the barrier tube in the optical axis direction between a retracted state and an shooting state is smaller than an amount of movement of the optical system retention frame in the optical axis direction between the retracted state and the shooting state.

9. The lens barrel according to claim 7, wherein the cam tube includes a third surface that is parallel with the optical axis,
    the coupling plate includes a fourth surface that is parallel with the optical axis, and
    the barrier blades are opened by the third surface pushing the fourth surface due to rotation of the cam tube.

10. The lens barrel according to claim 1, wherein the coupling plate includes a protrusion, and the second surface is provided at a portion of the protrusion that is furthest to the image side.

11. The lens barrel according to claim 10, wherein the optical system retention frame includes a hole in a surface that opposes the second surface, the protrusion being insertable into the hole.

12. The lens barrel according to claim 1, wherein the optical system retention frame includes a protrusion, and the second surface is provided at a portion of the protrusion that is furthest to the object side.

13. The lens barrel according to claim 12, wherein the coupling plate includes a hole in a surface that opposes the second surface, the protrusion being insertable into the hole.

14. An optical device comprising a lens barrel according to claim 1.

15. A lens barrel comprising:
    a lens with a shape in which edge portion regions of a circular shape are removed along straight lines at two locations so as to be symmetrical about the center of the circle;
    a lens barrier that opens and closes the object side of the lens; and
    a lens barrier driving portion that drives the lens barrier such that, in an opened state of the lens barrier, portions of the lens barrier are disposed at the regions that have been removed from the circular shape.

16. The lens barrel according to claim 15, wherein the regions removed from the circular shape are outside an effective light path of the lens through which object light that is focused on an imaging unit passes.

17. The lens barrel according to claim 15, wherein the imaging unit is a rectangular shape with a non-unitary aspect ratio, and
    the regions removed from the circular shape are regions at both ends in the direction of the short sides of the imaging unit.

18. The lens barrel according to claim 15, wherein the lens barrier includes two sets of barrier blades,
    in a closed state of the barrier blades, the two sets of barrier blades are deployed by the driving of the lens barrier driving portion so as to cover the object side of the lens, and in an opened state of the barrier blades, the two sets of barrier blades are retracted by the driving of the lens barrier driving portion so as to respectively overlap at positions that are symmetrical about the optical axis and open up the object side of the lens,
    in the opened state, of each of the sets of barrier blades, a barrier blade that is disposed at the image side is disposed at a location that includes at least a portion of one of the regions removed from the circular shape, and,
    of each of the sets of barrier blades, a portion of a barrier blade that is disposed at the object side is at the object side in the optical axis direction relative to the region removed from the circular shape, is disposed at a flat surface whose cross-section is circular if the lens is cut in a direction perpendicular to the optical axis, and covers an outer edge portion of an object side surface of the lens.

19. The lens barrel according to claim 18, wherein
the portion of the barrier blade that is disposed so as to cover the outer edge portion of the object side surface includes an inclined form that corresponds with a curved surface of the object side of the lens.

20. An optical device comprising a lens barrel according to claim 15.

* * * * *